(12) United States Patent
Rousu et al.

(10) Patent No.: US 9,288,031 B2
(45) Date of Patent: Mar. 15, 2016

(54) SWITCH ARRANGEMENT

(71) Applicant: Broadcom Corporation, Irvine, CA (US)

(72) Inventors: Seppo Olavi Rousu, Oulu (FI); Samuel Vehkalahti, Haukipudas (FI); Jarkko Petteri Mykkanen, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 48 days.

(21) Appl. No.: 14/243,087

(22) Filed: Apr. 2, 2014

(65) Prior Publication Data
US 2014/0295775 A1 Oct. 2, 2014

(30) Foreign Application Priority Data

Apr. 2, 2013 (GB) .................................. 1305885.4

(51) Int. Cl.
| | |
|---|---|
| H04B 1/44 | (2006.01) |
| H04M 1/00 | (2006.01) |
| H04L 5/08 | (2006.01) |
| H04L 5/14 | (2006.01) |
| H04B 7/26 | (2006.01) |
| H04B 1/00 | (2006.01) |
| H04B 1/40 | (2015.01) |
| H04L 5/00 | (2006.01) |
| H04L 5/16 | (2006.01) |

(52) U.S. Cl.
CPC ........ *H04L 5/08* (2013.01); *H04B 1/006* (2013.01); *H04B 1/40* (2013.01); *H04B 7/2621* (2013.01); *H04L 5/001* (2013.01); *H04L 5/0023* (2013.01); *H04L 5/0028* (2013.01); *H04L 5/1461* (2013.01); *H04L 5/16* (2013.01)

(58) Field of Classification Search
CPC .......... H04B 1/006; H04B 1/40; H04B 1/401; H04B 1/406; H04B 1/44; H04B 1/48
USPC ................... 455/73, 78, 83, 84, 552.1, 553.1
See application file for complete search history.

(56) References Cited

U.S. PATENT DOCUMENTS

| | | | | |
|---|---|---|---|---|
| 5,940,452 | A | * | 8/1999 | Rich .............................. 455/133 |
| 6,018,651 | A | * | 1/2000 | Bruckert et al. ........... 455/277.1 |
| 7,512,388 | B2 | * | 3/2009 | Snider ........................ 455/552.1 |
| 8,626,238 | B2 | * | 1/2014 | Stratford et al. .............. 455/561 |

(Continued)

FOREIGN PATENT DOCUMENTS

| | | |
|---|---|---|
| EP | 0751631 | 1/1997 |
| EP | 0771082 | 5/1997 |

(Continued)

*Primary Examiner* — Quochien B Vuong
(74) *Attorney, Agent, or Firm* — Oblon, McClelland, Maier & Neustadt, L.L.P.

(57) ABSTRACT

A switch arrangement comprises a first and second single pole switch. The pole of the first switch can selectively connect to a first and second path. The pole of the second switch can selectively connect to the first and second path. The first switch is configurable for a first mode of operation to connect a RF signal received at the pole to the first path to form a RF transmitter chain. The second switch is configurable for the first mode to connect the pole to the first path to form a RF receiver chain for receiving a RF signal. The first switch is configurable for a second mode to connect a RF signal received at the pole to the second path to form a second RF transmitter chain.

18 Claims, 39 Drawing Sheets

(56) References Cited

U.S. PATENT DOCUMENTS

2004/0204037 A1* 10/2004 He et al. .................... 455/553.1
2006/0178165 A1   8/2006 Vassiliou et al.

FOREIGN PATENT DOCUMENTS

| EP | 0829970 | 3/1998 |
|----|---------|--------|
| EP | 1887706 | 2/2008 |

* cited by examiner

SWITCH ARRANGEMENT

TECHNICAL FIELD

The present invention relates to a switch arrangement for a radio frequency circuit, a wireless device, a method of operating a wireless device, and a method of testing a radio frequency circuit for a wireless device.

BACKGROUND

Communication technologies such as cellular wireless systems are continually evolving in order to provide enriched services to end users. As such, a wireless device may typically be required to support services provided by 3G WCDMA (wideband code division multiple access)/HSPA (high speed packet access) and 4G LTE (Long Term Evolution) as well as being required to have a backward compatibility with legacy systems such as 2G GSM (Global System for Mobile Communications) and 2.5G GPRS (General Packet Radio Service)/EDGE (Enhanced Data Rates for GSM Evolution). Additionally, a wireless device may be required to operate in ad hoc networks and public safety networks. The wireless device may also additionally or alternatively operate using device-to-device communications. The wireless device may operate using different duplex modes of communication such as time-division duplex (TDD) and/or frequency-division duplex (FDD) modes of operation. Furthermore, it may be desirable for a wireless device to be able to operate in various differing frequency bands. This would be useful, for example, if a user wanted to use their wireless device in different countries where the mobile networks of the different countries are each licensed to use different frequency bands. The wireless devices can therefore be designed as multi-band devices, including, for example, dual-band, tri-band, quad-band and penta-band devices, and so forth.

A wireless device that can operate in multiple modes and across multiple allocated frequency bands is generally known as a multi-mode, multiband (MMMB) device. A MMMB device uses radio frequency circuitry, generally known as a radio frequency front-end (RF FE), that is designed in a specific manner to provide MMMB capabilities. As such, the RF FE may have a dedicated transmitter chain and dedicated receiver chain for each mode and band of operation. Each transmitter chain typically comprises a power amplifier (PA) and a filter. Each PA and filter has a characteristic associated with a selected mode and band of operation, such as a predetermined frequency response. This is so that radio frequency signals can be transmitted in accordance with that selected mode and band of operation. Each receiver chain typically comprises a frequency response selective filter as well as a low noise amplifier (LNA). Again, each filter and LNA has a characteristic associated with a selected mode and band of operation, such as a predetermined frequency response. This is so that a path can be provided for reception of radio frequency signals in accordance with the selected mode and band of operation. The RF FE for the MMMB device also comprises a switch arrangement, such as a mode switch and an antenna switch module, which are used to select the mode and frequency band of operation.

DETAILED DESCRIPTION

Figure 1:
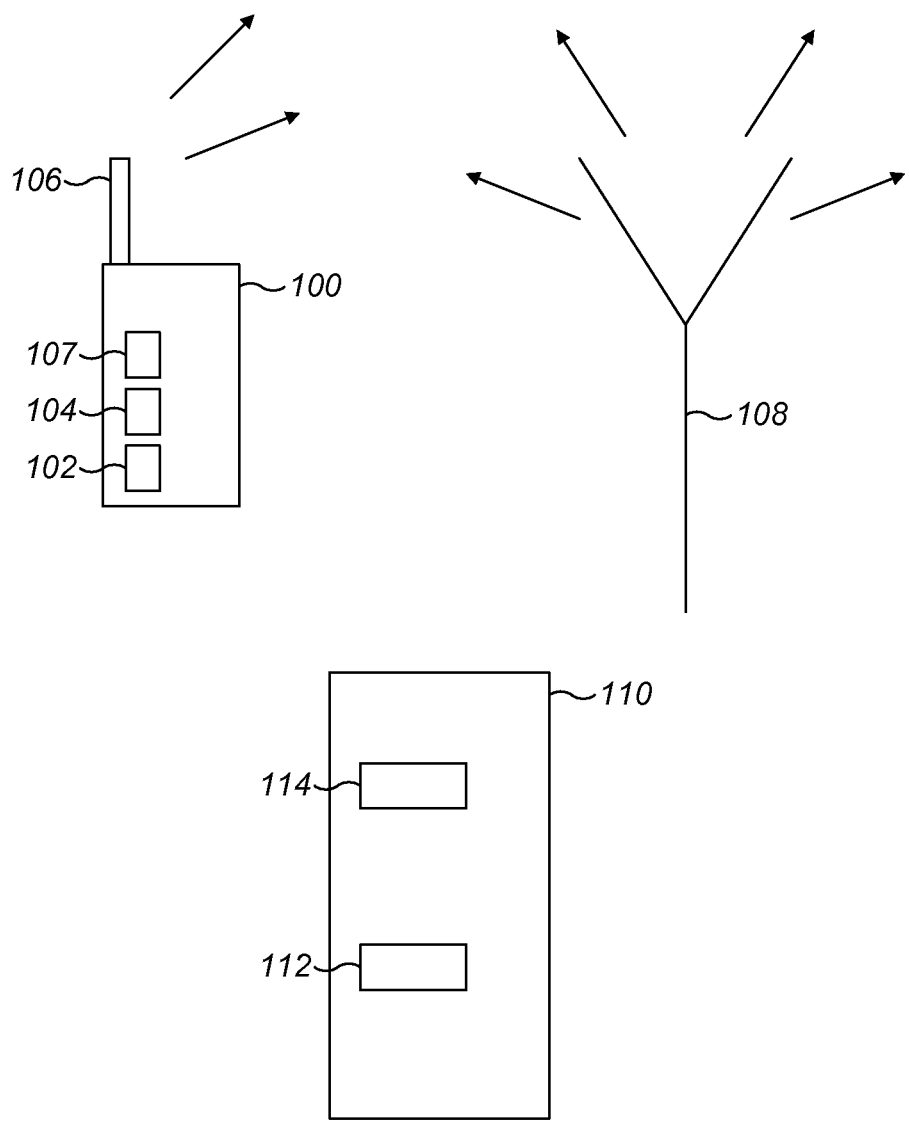
FIG. 1 shows a schematic block diagram of an example of system architecture according to an embodiment of the present invention.

"Wireless devices" include in general any device capable of connecting wirelessly to a network and/or a communication counterpart such as another wireless device. The term "wireless devices" includes in particular mobile devices including mobile or cell phones (including so-called "smart phones"), personal digital assistants, pagers, tablet and laptop computers, content-consumption or generation devices (for music and/or video for example), data cards, consumer electronic devices, public safety communication devices, USB dongles, modem modules, modem chipsets etc., as well as fixed or more static devices, such as personal computers, game consoles and other generally static entertainment devices, various other domestic and non-domestic machines and devices, etc. The term "user equipment" or UE is often used to refer to wireless devices in general, and particularly mobile wireless devices.

The terms "transmitter" and "receiver" are also used herein and, unless the context requires otherwise, are to be construed broadly to include the whole of a device that is transmitting and/or receiving wireless signals as well as only particular components of a device that are concerned with transmitting and/or receiving wireless signals or causing or leading to the transmission/reception of wireless signals.

Reference will sometimes be made in this specification to "network", "network control apparatus" and "base station". In this respect, it will be understood that the "network control apparatus" is the overall apparatus that provides for general management and control of the network and connected devices. Such apparatus may in practice be constituted by several discrete pieces of equipment. Moreover for convenience and by convention, the terms "network", "network control apparatus" and "base station" will often be used interchangeably, depending on the context.

Reference will sometimes be made to "poles", "throws" and "contact points" when discussing switches and switch arrangements. As used herein, a pole is a singular connection point of a switch that can be selectively connected to more than one other connection point. The other connection points that the pole can connect to via the switch are referred to herein as contact points, of which there may be several. A throw as used herein refers to a number of positions between which the switch can change in order to form a connection between the pole and one of the contact points. Thus, for example, a single-pole, double-throw (SPDT) switch will comprise one pole (hence the term "single-pole") and two contact points. The pole can be selectively connected to either of the two contact points. As the switch can be "thrown" into two different positions or configurations in order to form connections with the two contact points, the switch is given the name "double-throw".

According to a first aspect of the present invention, there is provided a switch arrangement for a radio frequency circuit, the switch arrangement comprising: a first switch comprising a single pole, the first switch being configurable to selectively connect said pole to one of at least a first communication path and a second communication path; and a second switch comprising a single pole, the second switch being configurable to selectively connect said pole to one of at least the first communication path and the second communication path, wherein the first switch is configurable for a first mode of operation to connect a radio frequency signal received at the pole of the first switch via a power amplifier from a processing system to the first communication path to form at least a part of a transmitter chain for transmitting radio frequency signals in the first mode; wherein the second switch is configurable for the first mode of operation to connect the pole of the second switch to the first communication path for receiving a radio frequency signal at the pole of the second switch via the first communication path to form at least a part of a receiver chain for receiving radio frequency signals in the first mode; and wherein the first switch is configurable for a second mode of operation to connect a radio frequency signal received at the pole of the first switch via a said power amplifier from a said processing system to the second communication path to form at least a part of a second transmitter chain for transmitting radio frequency signals in the second mode.

Configuring the switch arrangement to selectively connect either the pole of the first switch or the pole of the second switch with the first communication path enables a sharing of the communication path in order to respectively form a transmitter chain or receiver chain for the first mode of operation. This formation of the transmitter chain or receiver chain allows the radio frequency (RF) circuit to perform either a transmit or receive operation for the first mode. The sharing of the communication path does away with the need for a dedicated transmit path and a separate dedicated receive path for the first mode of operation. This in turn helps minimize the number of components in the RF circuitry, and hence also minimizes the cost of producing the RF circuit. Furthermore, reducing the number of RF components reduces the required number of switch throws. The reduction in component count also reduces insertion loss in the signal path (i.e. the loss in signal power due to a component along a signal path). This reduction in insertion loss can improve cell coverage by a UE that uses the RF circuit and can also increase the UE operational lifetime (especially in special purpose power communication devices that use battery power, solar cells and temperature difference). The sharing of the communication path also allows a space-saving compared with the situation where dedicated transmit and receive paths are used. Further savings can be achieved due to improved reliability in production assembly of the RF circuit and field operation due to reduced amount of soldering joints between components and the printed wired board, LTCC (low temperature co-fired ceramic) devices or the like.

Using a first switch and a second switch allows multiple configurations for the switch arrangement whereby the connections formed by the first switch are independent of the connections formed by the second switch.

In an embodiment, the switch arrangement comprises a first filter in the first communication path, the first filter having a characteristic associated with the first mode of operation so as to enable the filtering of radio frequency signals according to the first mode, and wherein the switch arrangement comprises a second filter in the second communication path, the second filter having a characteristic associated with the second mode of operation so as to enable the filtering of radio frequency signals according to the second mode. Therefore, the first filter in the first communication path can be shared for the transmit and receive operations in the first mode. For example, if the selected first mode of operation were to be a time division duplex (TDD) operation in a selected radio frequency band, a single transceiver path (i.e. the communication path) can be used for both the transmission and reception of RF signals in the TDD mode. The sharing of the first filter means that a separate transmitter chain and receiver chain, each having their own dedicated filter, is not required.

In an embodiment, at least one of the first mode and the second mode of operation is a time division duplex (TDD) mode of operation.

In an embodiment, the first mode of operation is a time division duplex (TDD) mode of operation and the second mode of operation is a frequency division duplex (FDD) mode of operation.

In an embodiment, the second switch is configurable to connect the pole of the second switch to the second communication path for receiving a radio frequency signal at the pole of the second switch via the second communication path to form at least a part of a receiver chain for receiving radio frequency signals in the second mode. Therefore, the second communication path can also be shared in order to minimize the number of components in the radio frequency circuit and hence the cost. A space-saving is also provided for the radio frequency circuitry as a lower number of components is required compared with circuit arrangements that use dedicated receiver and transmitter chains. Similar advantages as a consequence of the sharing of the first communication path as described above will be apparent for the sharing of the second communication path.

In an embodiment, the first switch and the second switch are configurable in dependence on at least one received control signal indicative of a selected mode of operation. This allows various switch arrangement configurations so that the radio frequency circuit can perform different types of operation. For example, the switch arrangement could be configured to provide a transmit capability in a TDD mode of operation, a receive capability in the TDD mode of operation, a transmit and reception capability in a FDD mode of operation, and so on (various other types of operation are possible). In some examples, the switch arrangement may be implemented without FDD mode.

In an embodiment, the first switch is configurable for a third mode of operation to connect a radio frequency signal received at the pole of the first switch via a said power amplifier from a said processing system to a third communication path to form at least a part of a transmitter chain for transmitting radio frequency signals in the third mode.

In an embodiment, the second switch comprises a first terminator associated with the first communication path and a second terminator associated with the second communication path, the first terminator and the second terminator being arranged to selectively use impedance matching so as to minimize reflection of received radio frequency signals on the respective first or second communication path when that communication path is not being used for communications in accordance with a selected mode of operation.

In an embodiment, the second switch comprises an impedance tuneable terminator associated with the pole of the second switch, the impedance tuneable terminator being arranged to selectively use tuneable impedance matching so as to prevent reflection of radio frequency signals at the pole of the second switch when the second switch is not being used for a mode of operation.

In an embodiment, the first switch is configurable to selectively form connections between said pole of the first switch and each of a plurality of communication paths so as to enable transmission of radio frequency signals in one of a plurality of modes of operation including one or more time division duplex (TDD) modes of operation.

In an embodiment, the first switch is configurable to selectively form connections between said pole of the first switch and each of a plurality of communication paths so as to enable transmission of radio frequency signals in one of a plurality of modes of operation including at least one time division duplex (TDD) mode of operation and at least one frequency division duplex (FDD) mode of operation. The first switch therefore enables the radio frequency circuitry to provide a number of transmission operations including both TDD and FDD transmit modes of operation.

In an embodiment, the second switch is configurable to selectively form connections between said pole of the second switch and at least one of the plurality of communication paths so as to enable reception of radio frequency signals in at least one time division duplex (TDD) mode of operation. The second switch therefore enables the radio frequency circuitry to provide at least one TDD receive mode of operation.

In an embodiment, the first switch and the second switch are simultaneously configurable to form connections for enabling a carrier aggregation operation to be performed.

In an embodiment, the pole of the first switch and the pole of the second switch are arranged to selectively connect to the first communication path via a shared contact point.

In an embodiment, when one of the first switch and the second switch is arranged to connect to the shared contact point, the other switch is arranged to avoid connecting to the shared contact point.

In an embodiment, the first switch and the second switch are arranged to connect to the shared contact point at the same time so as to form a closed loop circuit for one or more of a self-test mode or configuration mode to be performed.

According to a second aspect of the present invention, there is provided a wireless device comprising: at least one antenna arranged to transmit and receive radio frequency signals; an antenna switch module arranged to selectively connect one of at least a first communication path and a second communication path to the antenna for at least one of transmitting and receiving radio frequency signals; a processing system arranged to generate radio frequency signals for transmission by the antenna and arranged to process radio frequency signals received by the antenna; a power amplifier connected to the processing system and arranged to amplify radio frequency signals for transmission by the antenna; and a switch arrangement comprising: a first switch comprising a single pole, the first switch being configurable to selectively connect said pole to one of the first communication path and the second communication path; and a second switch comprising a single pole, the second switch being configurable to selectively connect said pole to one of the first communication path and the second communication path, wherein the first switch is configurable for a first mode of operation to connect a radio frequency signal received at the pole of the first switch via the power amplifier from the processing system to the first communication path to form at least a part of a transmitter chain for transmitting radio frequency signals in the first mode; wherein the second switch is configurable for the first mode of operation to connect the pole of the second switch to the first communication path for receiving a radio frequency signal at the pole of the second switch via the first communication path to form at least a part of a receiver chain for receiving radio frequency signals in the first mode; and wherein the first switch is configurable for a second mode of operation to connect a radio frequency signal received at the pole of the first switch via the power amplifier from the processing system to the second communication path to form at least a part of a second transmitter chain for transmitting radio frequency signals in the second mode.

According to a third aspect of the present invention, there is provided a method of operating a wireless device, the wireless device comprising an antenna, an antenna switch module, a processing system, a power amplifier connected to the processing system, and the switch arrangement comprising a first single pole, multiple throw switch and a second single pole, multiple throw switch, the method comprising: determining a mode of operation for operation of the wireless device; selectively connecting at least one of the first switch and the second switch to at least one of a first communication path and a second communication path for at least one of transmission and reception of radio frequency signals in accordance with the determined mode of operation; responsive to the determined mode of operation being a first mode of operation for transmitting radio frequency signals, connecting a radio frequency signal received at the pole of the first switch via the power amplifier from the processing system to the first communication path to form at least a part of a transmitter chain for transmitting radio frequency signals in the first mode; responsive to the determined mode of operation being a first mode of operation for reception of radio frequency signals, connecting the pole of the second switch to the first communication path for receiving a radio frequency signal at the pole of the second switch via the first communication path to form at least a part of a receiver chain for receiving radio frequency signals in the first mode; and responsive to the determined mode of operation being a second mode of operation for transmission of radio frequency signals, connecting a radio frequency signal received at the pole of the first switch via the power amplifier from the processing system to the second communication path to form at least a part of a second transmitter chain for transmitting radio frequency signals in the second mode.

According to a fourth aspect of the present invention, there is provided a method of testing a radio frequency circuit for a wireless device, the method comprising: responsive to a determination that a test mode of operation is required, selectively connecting each of a single pole of a first switch and a single pole of a second switch to at least one of a first contact point and a second contact point, the first contact point and the second contact point being connected to a first communication path and a second communication path respectively; and responsive to the determined test mode of operation being a first internal test mode of operation, simultaneously connecting the first switch and the second switch to the first contact point so as to enable a test signal received at the pole of the first switch via a power amplifier from a processing system to be returned to the processing system via the pole of the second switch.

The method can therefore be used to selectively form "closed loops" in the radio frequency circuit. The closed loops are formed such that test signals can be sent (transmitted and received) around the circuit (i.e. internally). This can be useful, for example, to identify components or pathways in the circuit that have malfunctioned or require calibrating by testing using the first internal test mode of operation.

In an embodiment, the method comprises, responsive to the determined test mode of operation being a second internal test mode of operation, simultaneously connecting the first switch and the second switch to the second contact point so as to enable a test signal received at the pole of the first switch via a power amplifier from a processing system to be returned to the processing system via the pole of the second switch.

In an embodiment, the method comprises, responsive to the determined test mode of operation being for testing components in the radio frequency circuitry associated with a first mode of operation for transmitting radio frequency signals and associated with a second mode of operation for reception of radio frequency signals: connecting a test signal received at the pole of the first switch via the power amplifier from the processing system to the first communication path that is associated with the first mode of operation; connecting, at an antenna switch module of the radio frequency circuitry, the first communication path with the second communication path that is associated with the second mode of operation so as to route the test signal from the first communication path to the second communication path; and connecting the pole of the second switch to the second communication path so as to enable the test signal received at the pole of the second switch via the second communication path to be returned to the processing system.

Further features and advantages of the invention will become apparent from the following description of preferred embodiments of the invention, given by way of example only, which is made with reference to the accompanying drawings.

FIG. 1 shows schematically a UE 100 or wireless device, in this case in the form of a mobile phone/smartphone/modem on module. The UE 100 contains the necessary radio module 102, processor(s) and memory/memories 104, antenna(s) 106, etc. to enable wireless communication with the network or communication counterpart(s). The operational UE 100 may have at least one antenna, which may be external to the UE 100, internal to the UE 100 or for example have a special purpose galvanic interface to radio frequency circuitry. The user equipment 100 in use is in communication with a radio mast 108 or other communication counterpart(s) such as another wireless device (not shown). As a particular example in the context of UMTS (Universal Mobile Telecommunications System), there may be a network control apparatus 110 (which may be constituted by for example a so-called Radio Network Controller) operating in conjunction with one or more Node Bs (which, in many respects, can be regarded as "base stations"). As another example, LTE (Long Term Evolution) makes use of a so-called evolved Node B (eNB) where the RF transceiver and resource management/control functions are combined into a single entity. The term "base station" is used in this specification to include a "traditional" base station, a Node B, an evolved Node B (eNB), or any other access point to a network, unless the context requires otherwise. The network control apparatus 110 (of whatever type) may have its own processor(s) 112 and memory/memories 114, etc.

The UE 100 comprises a "radio frequency front end" (RF FE) 107, which generally defines the circuitry between the UE antenna and radio frequency circuitry such as a Radio Frequency Integrated Circuit (RFIC), which may be integrated with baseband circuitry. The baseband circuitry may use direct conversion methods or intermediate frequency (IF) methods to process signals received by the RF FE 107 or signals to be output by the RF FE 107. As such, the RF FE 107 typically comprises components such as one or more power amplifiers (PAs), one or more low noise amplifiers (LNAs), one or more filters, one or more RF switches and one or more interfaces to the antenna and processing circuitry (such as digital baseband circuitry used to generate the initial signal for communications and that is also used to process a received signal for interpretation by the UE). The RF FE 107 thereby defines at least a part of what is generally known as a RF "transmitter chain" and at least a part of a RF "receiver chain" to enable the transmitting and/or receiving of radio frequency signals. The one or more interfaces typically comprise inputs and outputs to power the circuitry and for control signalling. The RF transmitter chain conveys RF signals from the digital baseband circuitry to a PA. The PA amplifies the signals and passes it to a filter having a characteristic associated with the mode and frequency band of operation. Specifically, the filter has a frequency selective response so as to selectively filter signals in order that signals in a specified frequency range can pass through with minimal loss and so that the unwanted frequencies (i.e. signals outside of the specified frequency range) are attenuated. The signals are then sent to an antenna for transmission. The RF receiver chain conveys signals received by the antenna to a filter having a characteristic associated with a mode and frequency band of operation. Again, this filter has a frequency selective response so as to selectively filter signals in order that signals in a specified frequency range can pass through with minimal loss and so that the unwanted frequencies are attenuated. The signals then pass to a LNA which amplifies and passes the signals to the digital baseband circuitry for processing and for output to a user of the UE 100.

The PA used in the RF FE 107 is capable of amplifying a plurality of signals, each signal having at least one characteristic associated with a specific mode and band of operation. The RF FE 107 therefore provides a "converged" MMMB capability or multi band capability for the mobile phone. The PA is said to be converged as a result of using at least one PA that can handle a plurality of different types of signal transmissions (i.e. those signals having differing modes and frequency bands of operation).

A switch arrangement is used to take the signal that is output from the PA as its input and to convey the signal to a filter, such as a band pass filter (BPF). The BPF is associated with a selected mode and frequency band of operation. The switch arrangement has a second input for receiving one or more control signals indicative of the selected mode and band of operation so that the switch arrangement knows which filter of a plurality of filters should be selected for the signal transmission. The control signal may therefore act as a trigger signal. Such triggering can be pre-programmed so as to provide various switch configurations in the switch arrangement. In some cases, a duplexer can be used in order to allow bi-directional or duplex communications along a single path. In particular, the duplexer can allow a transmit signal operating at a first frequency and a receive signal operating at a second, different frequency to share a common path. The duplexer may comprise one or more filters, such as BPFs, in order to filter the transmit signal and the receive signal. In other cases, frequency selective components such as triplexers, quadplexers and/or diplexers can be used.

Figure 2A:
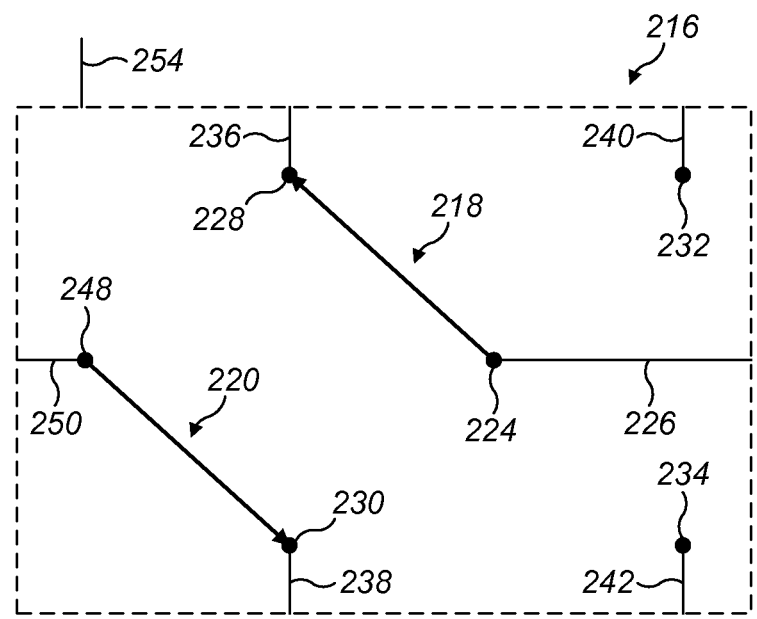
FIG. 2a shows a schematic diagram of a first example of a switch arrangement according to an embodiment of the present invention.

FIG. 2a shows a schematic diagram of a first example of a switch arrangement 216 in accordance with an embodiment of the invention. The switch arrangement 216 is for use in a RF FE 107 of a UE 100 and is configurable so that the UE 100 can operate in one or more modes and bands of operation according to the design of the RF FE 107. For example, the RF FE 107 may be for a UE 100 that can operate as a dual mode device, whereby it can communicate in a network or with a communication counterpart(s) using for example a time division duplex (TDD) mode of operation and/or a frequency division duplex (FDD) mode of operation, each of which is associated with a specific frequency bandwidth or frequency range. The communications may comprise one or more of voice (audio), data, video or other special purpose information.

The switch arrangement 216 comprises a first switch 218 and a second switch 220. The first switch 218 in this example is a single-pole, quadruple-throw switch (SP4T) and therefore comprises a single pole 224 and four contact points or nodes 228, 230, 232, 234. The single pole 224 is connected to an amplification path 226, which is coupled to an output interface of a power amplifier (not shown). The power amplifier (PA) is configured in a manner to allow a converged MMMB RF FE operation to be performed. The power amplifier is therefore arranged to amplify a variety of signals associated with various different modes and bands of operation. The quadruple-throw of the SP4T means that the first switch 218 can be "thrown" in order to selectively connect the first pole 224 to one of the four contact points 228, 230, 232, 234. A first contact point 228 is used to connect the first switch 218 to a first communication path 236 for transmitting radio frequency signals from the power amplifier in accordance with a first mode of operation. The first mode of operation is associated with a specified frequency band of operation. A second contact point 230 is used to connect the first switch 218 to a second communication path 238 for transmitting radio frequency signals from the power amplifier in accordance with a second mode and band of operation. A third contact point 232 is used to connect the first switch 218 to a third communication path 240 for transmitting radio frequency signals from the power amplifier in accordance with a third mode and band of operation. A fourth contact point 234 is used to connect the first switch 218 to a fourth communication path 242 for transmitting radio frequency signals from the power amplifier in accordance with a fourth mode and band of operation. It may be noted that in this example, the first contact point 228 and the second contact point 230 are shared with the second switch 220, though this may not be necessary in all embodiments. It may be noted further that whilst in this example, the first switch 218 is a four throw switch, and thus can selectively connect to one of four contact points 228, 230, 232, 234, the switch may in general have fewer or more throws, i.e. can selectively connect to fewer or more contact points. In general, the first switch 218 may be a SPxT switch, that is a single pole switch having x throws where x is an integer equal to two or more.

The second switch 220 is a single-pole, double-throw switch (SPDT) and comprises a single pole 248 and two contact points 228, 230. The single pole 248 connects to a receiver path 250 that leads to the digital baseband circuitry (not shown). The double-throw of the SPDT means that the second switch 220 can be "thrown" in order to selectively connect the pole 248 to either the first contact point 228 or the second contact point 230. As such, in this example the first switch 218 and the second switch 220 share the first contact point 228 and the second contact point 230 so that either switch can form connections with the first communication path 236 and the second communication path 238. The first contact point 228 is used to connect the single pole 248 of the second switch 220 to the first communication path 236 so that radio frequency signals can be received from the antenna in accordance with the first mode and band of operation. The second contact point 230 is used to connect the single pole 248 of the second switch 220 to the second communication path 238 so that radio frequency signals can be received from the antenna in accordance with the second mode and band of operation. As noted above, the first contact point 228 and the second contact point 230 are shared between the first switch 218 and the second switch 220 in this example. However, this is not necessary for all cases. In another example, the contact points of one switch may be electrically connected to respective contact points of the other switch in some other way, such as by appropriate circuitry or a wired connection for example. Although in this example, the second switch 220 is a SPDT switch, in other examples the second switch 220 may have fewer or more throws and therefore in general may be a SPxT switch having x throws where x is an integer equal to two or more.

The switch arrangement 216 is arranged to receive a control signal via input connection 254 that is indicative of the mode and band of operation for which the switch arrangement 216 should be configured, and hence which contact points should be connected by the first switch 218 and the second switch 220. Although only a single input connection 254 is shown for the control signal, the control signal may be provided by one or more input connections. The input connection 254 may also be used to provide powering to the switch arrangement 216. The powering of the switch arrangement 216 and control may use a single wired connection, multi-wired connection, or a wireless interface.

The first switch 218 provides four configurations for transmitting a signal in different modes and bands of operation, such as a first TDD transmit mode in a first frequency band of operation, a second TDD transmit mode in a second frequency band of operation, a first FDD mode in a third frequency band of operation and a second FDD mode in a fourth frequency band of operation. When one of the switches 218, 220 connects to a shared contact point 228, 230 then the other switch 220, 218 is arranged so that it does not connect to that shared contact point 228, 230. For example, as shown in FIG. 2a, if the first switch 218 connects to the first contact point 228 then the second switch 220 is arranged so that it does not connect to that first contact point 228. If however the second switch 220 is connected to the first contact point 228 then the first switch 218 is arranged so that it does not connect to that first contact point 228. Similarly, if the first switch 218 is connected to the second contact point 230, then the second switch 220 is arranged so that it does not connect to that second contact point 230. If the second switch 220 is connected to the second contact point 230, then the first switch 218 is arranged so that it does not connect to that second contact point 230. To avoid a contact point being shared at the same time, the avoiding switch (i.e. the switch that is arranged to avoid connection to that contact point) can either be positioned in an off position (not shown) where it is not connected to any of the contact points, or the switch can be connected to one of the other contact points. In a further example, two or more switches can be arranged in series to avoid a contact point being shared at the same time (not shown). Contact point circuitry may contain such switches for design end functionality. Alternatively, the avoiding switch can be arranged to connect to an isolation connection point as shown in FIG. 2b and discussed further below.

Generally, where a switch is connected with a contact point but is not used to form any active connection (i.e. a connection that is used for signal communications), the contact point is made to be at a high impedance so that the likelihood of any RF signals flowing to that contact point disturbing other RF signals in the circuit is minimized. The arrangement of a contact point to have a high impedance when it is not being used to form an active connection can be a feature that is inherent in the design of the switch (i.e. the switch arrangement can be designed in a manner so that the contact points are by default at a high impedance when not forming a part of an active connection). Alternatively, the contact points may have a controllable impedance that is responsive to one or more control signals received from a control source external to the switch arrangement or controller controlling switch arrangement, such as via input connection 254.

Figure 11A:
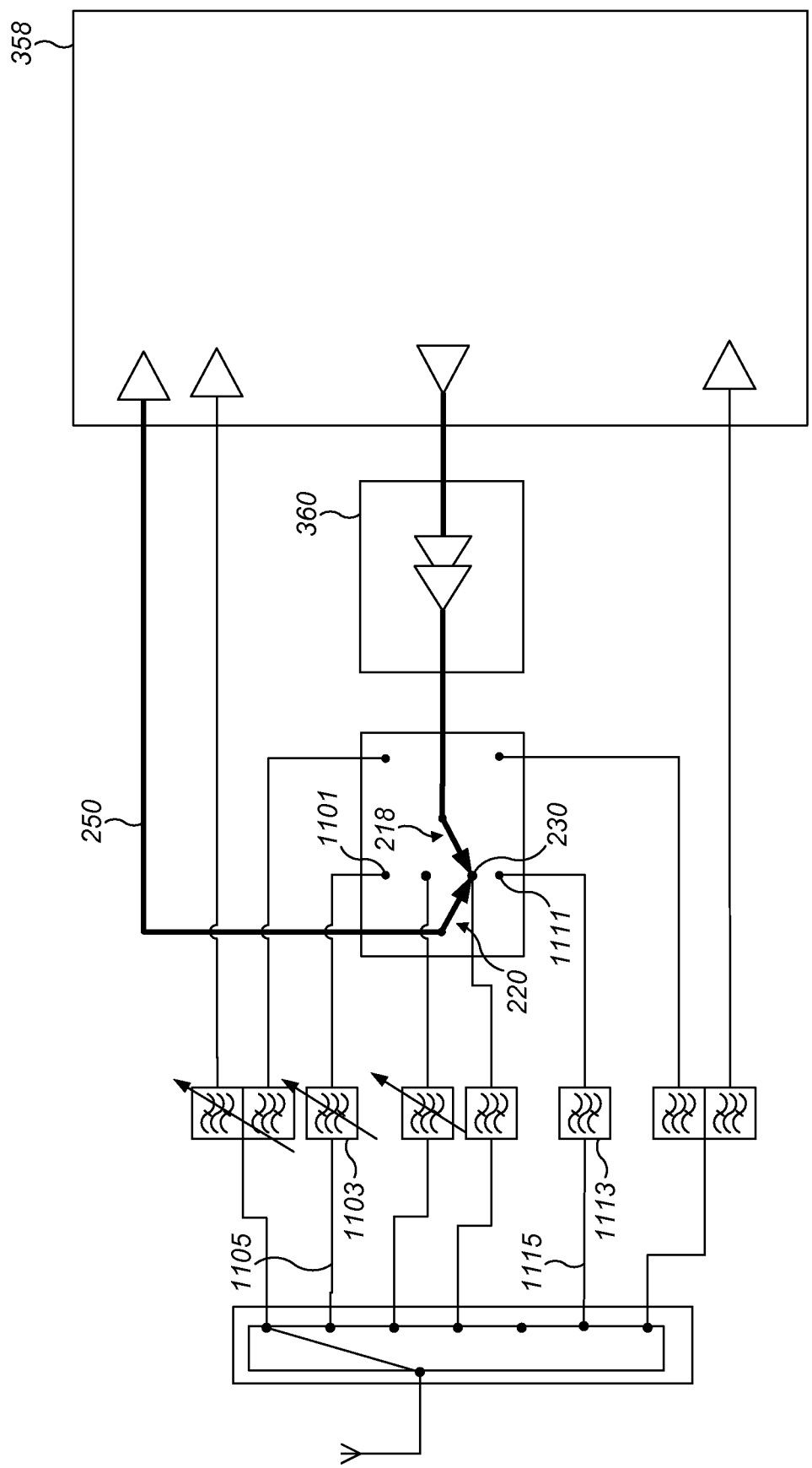
FIGS. 11a to 11c show schematic circuit diagrams of different operations of an eighth example of a wireless device according to an embodiment of the present invention.

In other examples, as discussed further below, the switch arrangement 216 can be used for a self-test mode or calibration mode such that the first switch 218 and the second switch 220 are arranged to connect to the same contact point at the same time in order to form an internal closed loop in the RF FE 107, such as is shown in FIG. 11a.

Figure 2B:
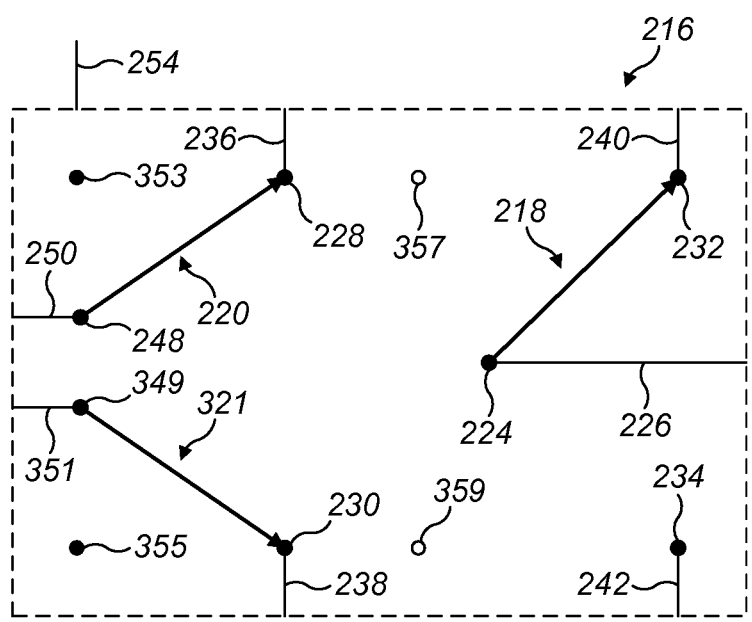
FIG. 2b shows a schematic diagram of a second example of a switch arrangement according to an embodiment of the present invention.

FIG. 2b is a schematic diagram showing a second example of a switch arrangement 316 in accordance with an embodiment of the invention (with like reference numerals applying for FIG. 2b as with FIG. 2a). This switch arrangement is similar to the switch arrangement shown in FIG. 2a but additionally comprises a third switch 321 having a single pole 349 connected to a second receiver path 351 (i.e. where the second receiver path 351 leads to the digital baseband circuitry and is separate from the receiver path 250), a first isolation connection point 353, a second isolation connection point 355, a first terminator 357 and a second terminator 359. The second switch 220 is arranged to selectively connect with one of the first contact point 228 and the first isolation connection point 353. The third switch 321 is arranged to selectively connect with one of the second contact point 230 and the second isolation connection point 355. The first terminator 357 and the second terminator 359 are arranged to cooperate with the first contact point 228 and the second contact point 230 respectively and use impedance matching to minimize RF signals from being reflected at these points. In particular, when either the first contact point 228 or the second contact point 230 is not used to form a connection, the respective terminator 357, 359 associated with that contact point 228, 230 can be used to minimize any RF signals at that contact point 228, 230 from being reflected. The impedance matching of each terminator 357, 359 thereby acts to minimize any interference to signal communications as a consequence of reflected RF signals. The impedance matching of each terminator 357, 359 may be controllable according to one or more selected characteristics. For example, the impedance matching may be controlled according to characteristics such as the communication frequency, frequency bandwidth of the selected mode of operation and/or the type of configured mode of operation. The second switch 220 is arranged to selectively connect with the first isolation connection point 353 when the second switch 220 is not used to form an active connection (i.e. a connection for either conveying transmitted signals for output or conveying received signals for processing). Similarly, the third switch 321 is arranged to selectively connect with the second isolation connection point 355 when the third switch 321 is not used to form an active connection. The first and second isolation connection points 353, 355 are configured with a specified impedance, such as a 50 ohm impedance, so as to isolate signals and minimize reflection of RF signals. In an alternative example, the first and second isolation connection points 353, 355 may be replaced with a single isolation connection point that can be shared by the second switch and the third switch. In an alternative example, the impedance matching terminators 357, 359 may be replaced with a single terminator for minimizing said reflection of RF signals.

Terminators can be used at any point where there is a possibility of RF signal reflection. The terminators may be tuneable so that they can have variable impedance matching. For example, an impedance tuneable terminator can be associated with the single pole of the second switch 220 and/or the single pole of the third switch 321 so as to minimize RF signals being reflected at these points when the switches are not being used. As such, the impedance tuneable terminators may tune their impedance matching in accordance with the mode of operation.

FIGS. 3a to 3g show various schematic diagrams of a first example of a RF FE 107 according to an embodiment of the invention. The RF FE 107 comprises the switch arrangement 216 of FIG. 2a, which can be arranged in various configurations in accordance with a desired mode and band of operation. In general, the RF FEs 107 of these figures comprise a radio frequency integrated circuit (RFIC) 358, a power amplifier (PA) 360, a switch arrangement 216, a plurality of filters 362, an antenna switch module 364, an antenna 366, a balun 368 and one or more low noise amplifiers (LNAs) 370. The RFIC 358 is connected to the power amplifier 360, which in turn is connected to the switch arrangement 216. The power amplifier 360 is arranged to amplify signals received from the RFIC 358. These signals may be characteristic of different modes and frequency bands of operation. The switch arrangement 216 comprises a first SP4T switch and a second SPDT switch arranged in the manner described with reference to FIG. 2a (with like reference numerals applying for FIGS. 3a to 3g as with FIG. 2a). The switch arrangement 216 is configurable responsive to a control signal (and powering) that is received from the RFIC 358. It will be appreciated that such control signals may also be received from other RFICs, a PMIC (Power Management Integrated Circuit), a modem BB, application circuitry or any special purpose control circuitry. The one or more matchings, controllers and circuitries may be integrated into a single circuit arrangement that operates according to designed functionalities. Such a control signal is indicative of a selected mode and frequency band of operation. The switch arrangement 216 therefore allows a signal from the power amplifier to be passed along one of four communication paths 236, 238, 240, 242, which in this example are a first TDD communication path 236 comprising TDD B38 band pass filter 362-1, a second TDD communication path 238 comprising TDD B41 band pass filter 362-2, a first FDD communication path 240 comprising a FDD B7 duplexer 362-3 and a second FDD communication path 242 comprising a FDD duplexer 362-4 characteristic of a band other than B7. Any of the TDD or FDD communication paths may be used for cellular communication and/or D2D (device to device) communication in allocated cellular bands, ad-hoc frequency arrangements or in an ISM (International, Scientific and Medical) band. The switch arrangement 216 also allows a signal received via either of the first TDD communication path 236 or the second TDD communication path 238 to be routed via the balun 368 to a first LNA 370-1. The balun 368 is used to convert an unbalanced signal to a balanced signal. In some exemplary embodiments the LNA input may be single ended and the balun 368 is thus not essentially needed. The first LNA 370-1 amplifies the received signal and passes it to the RFIC 358. The antenna switch module 364 is also configured to receive a control signal and powering, the control signal being indicative of a mode and band of operation so that it can connect to one of the communication paths 236, 238, 240, 242 for signal communications (i.e. for either or both of a receive operation and a transmit operation). A secondary/diversity RF FE (not shown) may be implemented in the same manner as RF FE 107 and may be connected to the RFIC. The secondary/diversity RF FE may have a reception only functionality or it may additionally support transmit operations. Also, additional antennas may be present and the one or more antennas may share functionality with alternative radio access technologies or satellite positioning receiver(s). The RFIC system may also use other RFIC circuitry arrangements for alternative modes, frequency ranges and bands, which may share the antenna system with RF FE 107 or else may have their own antenna system.

Figure 3A:
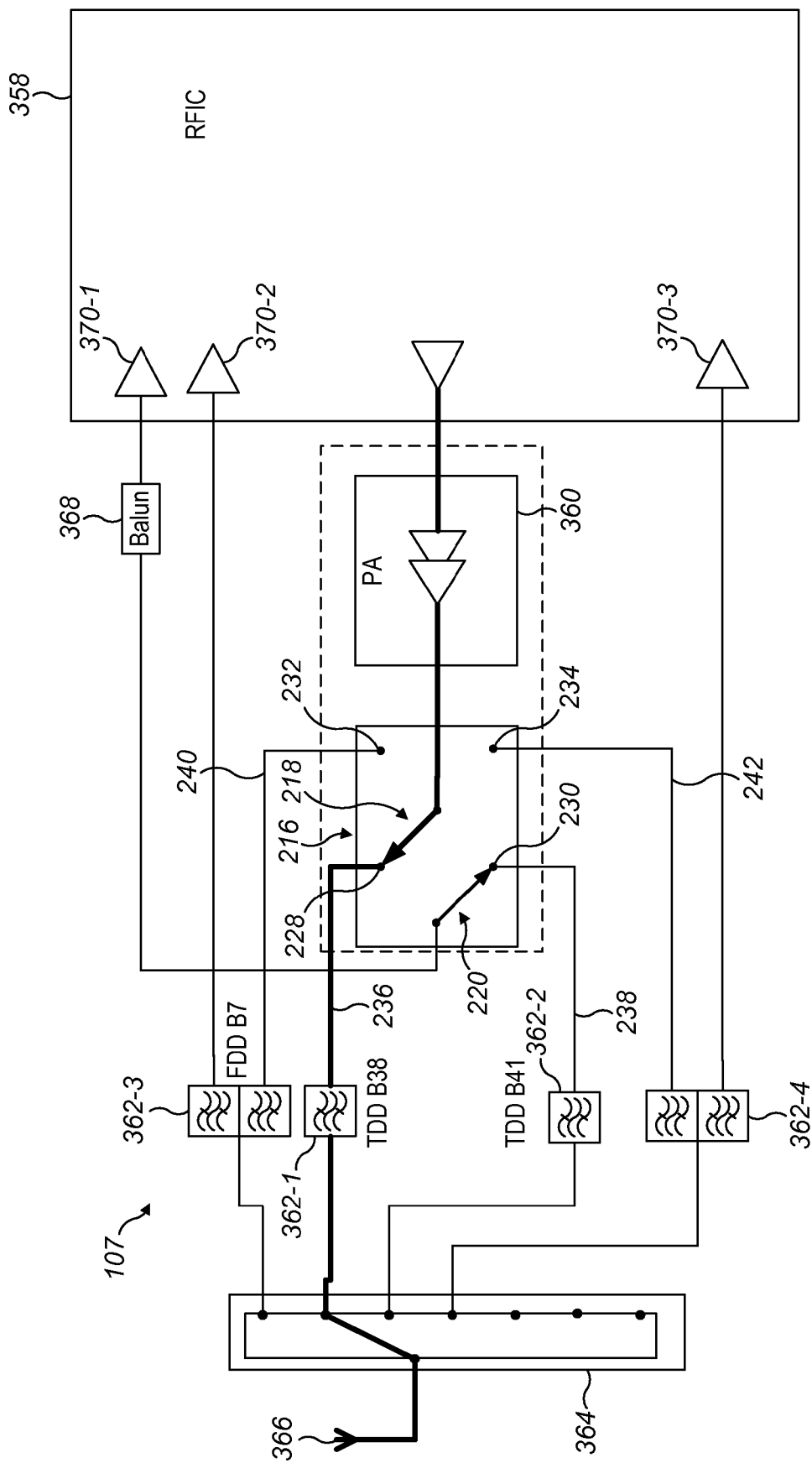
FIGS. 3a to 3g show schematic circuit diagrams of different operations of a first example of a wireless device according to an embodiment of the present invention.

FIG. 3a shows the RF FE 107 configured for an LTE TDD transmit operation in frequency band 38 (TDD B38), which has a frequency allocation of between 2570 MHz and 2620 MHz for signal transmission. The RFIC 358 generates a RF communications signal for transmitting in the TDD B38 mode and conveys it to the PA 360. The PA 360 amplifies the transmission signal, which is then passed to the switch arrangement 216. The switch arrangement 216 receives a control signal (not shown) from the RFIC 358 which causes the switch arrangement 216 to form appropriate connections so that the transmission signal can be routed to the correct communication path (i.e. the first TDD communication path 236). As such, the first switch 218 is configured so that it connects with the first contact point 228 and the second switch 220 is configured so that it is either in a disconnected position (i.e. not connected to any contact point), connected with the second contact point 230, or connected with an isolation connection point (such as is shown in FIG. 2b). The transmission signal is then passed to the TDD B38 band pass filter 362-1 for filtering. The filtered transmission signal then passes to the antenna switch module 364, which transfers the filtered transmission signal to the antenna 366 for transmission. Similarly to the switch arrangement 216, the antenna switch arrangement 364 also receives a control signal from the RFIC 358 to indicate to the antenna switch arrangement which communication path (i.e. the first TDD communication path 236 in this example) is to be connected to the antenna 366 in dependence on the mode and band of operation.

Figure 3B:
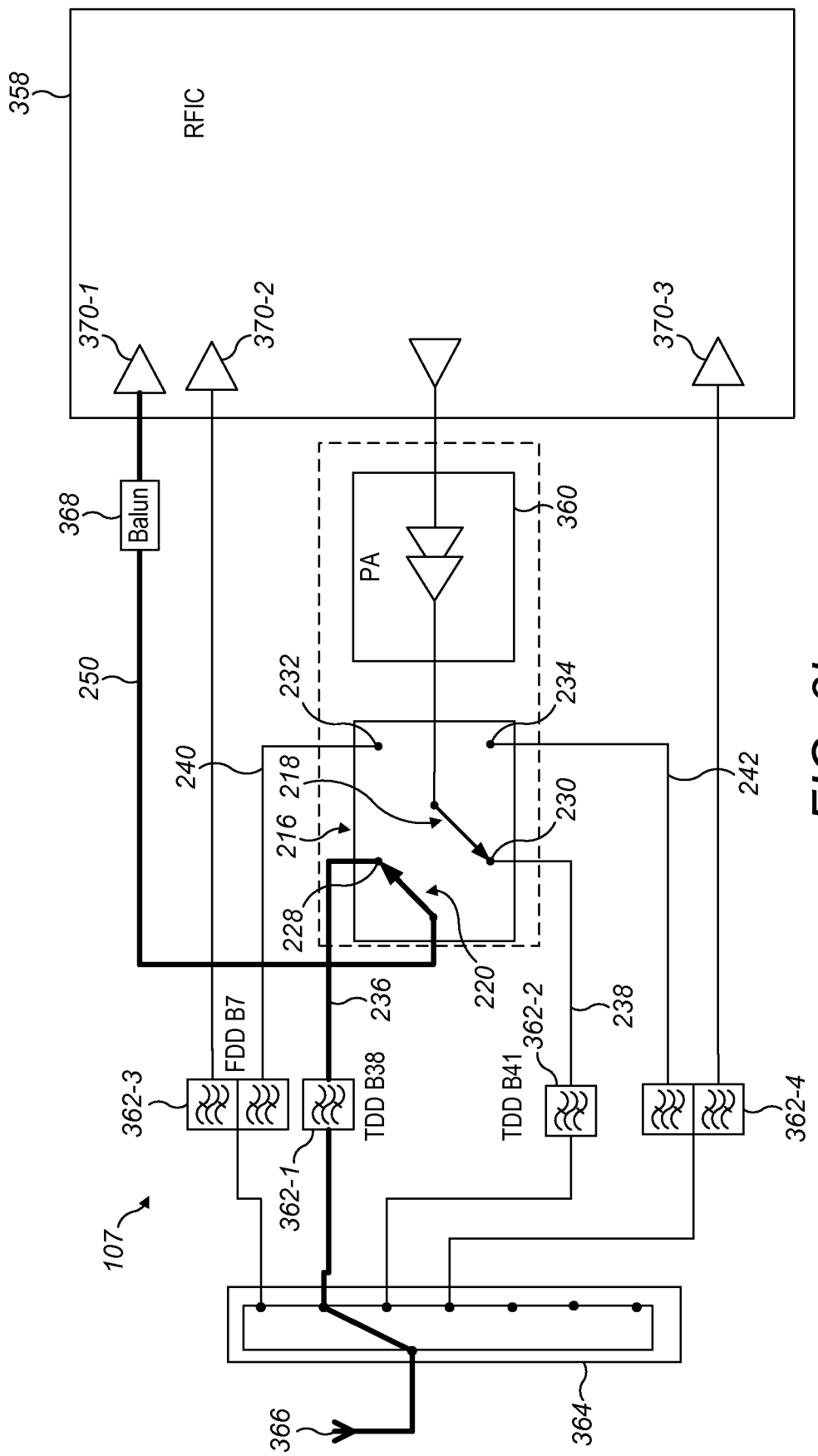

FIG. 3b shows the RF FE 107 configured for an LTE TDD receive operation in frequency band 38 (TDD B38). The antenna 366 receives an RF communications signal characteristic of the TDD B38 mode and the antenna switch module 364 routes the reception signal along the first TDD communication path 236 to the TDD B38 band pass filter 362-1 for filtering. The antenna switch module 364 is configured to connect to the first TDD communication path 236 responsive to a received control signal indicative the mode and band of operation. The filtered signal is then passed to the switch arrangement 216. The switch arrangement 216 receives a control signal from the RFIC 358 which tells the switch arrangement 216 that it should be in a configuration to permit the TDD B38 receive operation so that the reception signal can be routed to the RFIC 358. As such, the second switch 220 is arranged to connect with the first contact point 228 and the first switch 218 is positioned in either a disconnected position (i.e. not connected to any contact point), connected with a contact point 230, 232, 234 other than the first contact point 228, or connected with an isolation connection point (as shown in FIG. 2b), or isolation is arranged with switch in series (not shown). After connecting to the first contact point 228, the filtered reception signal is passed along the receiver path 250 to the balun 368. The reception signal is then passed via a first LNA 370-1 to the RFIC 358 for processing.

Figure 3C:
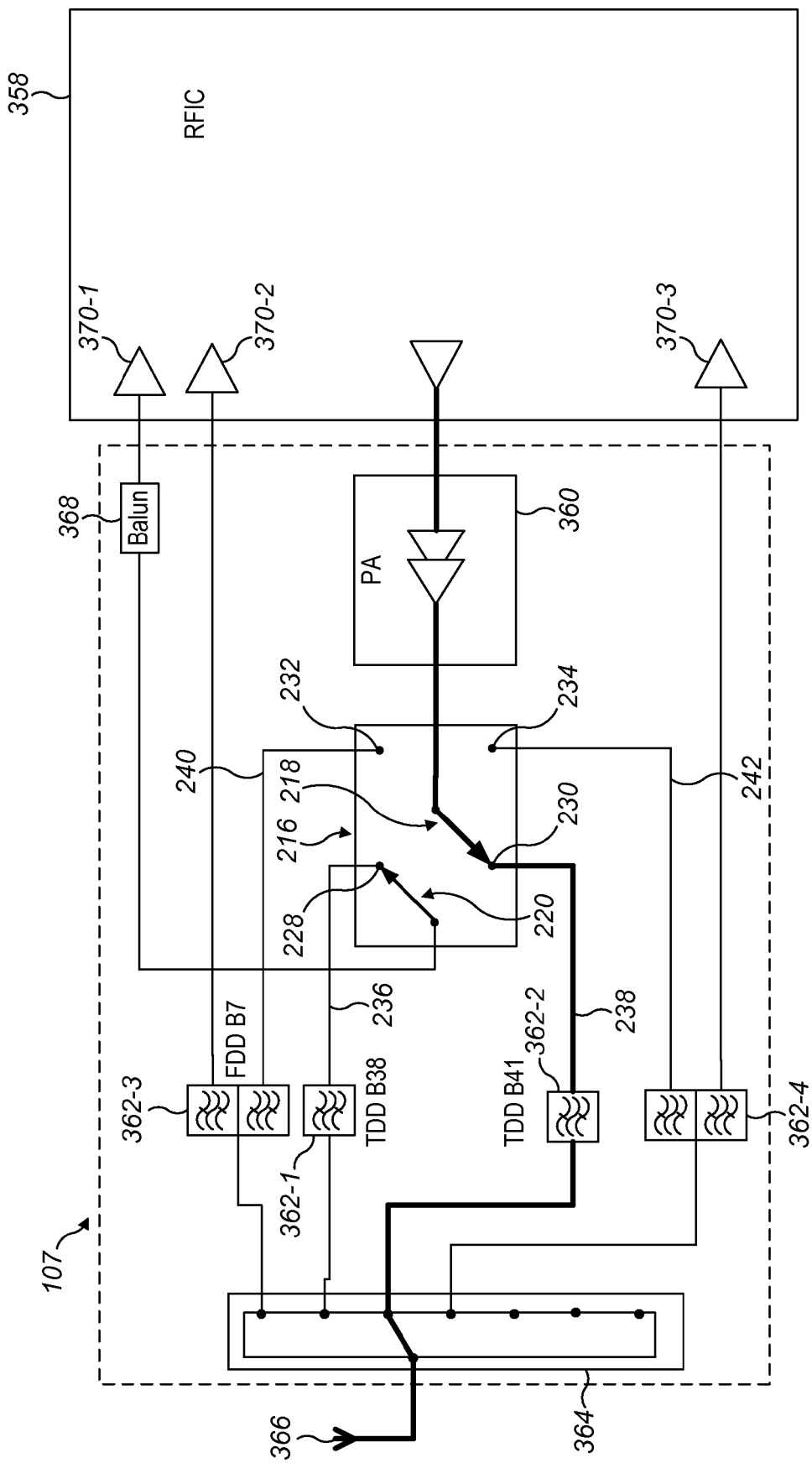

FIG. 3c shows the RF FE 107 configured for an LTE TDD transmit operation in frequency band 41 (TDD B41), which has a frequency allocation of between 2496 MHz and 2690 MHz for signal transmission. TDD B41 transmit mode is similar to TDD B38 transmit mode described above except that the first switch 218 is connected to second contact point 230 in order to enable signals to be transmitted along second TDD communication path 238, whilst second switch 220 is either in a disconnected position, connected to first contact point 228, or connected to an isolation connection point (not shown), or isolation is arranged with switch in series (not shown).

Figure 3D:
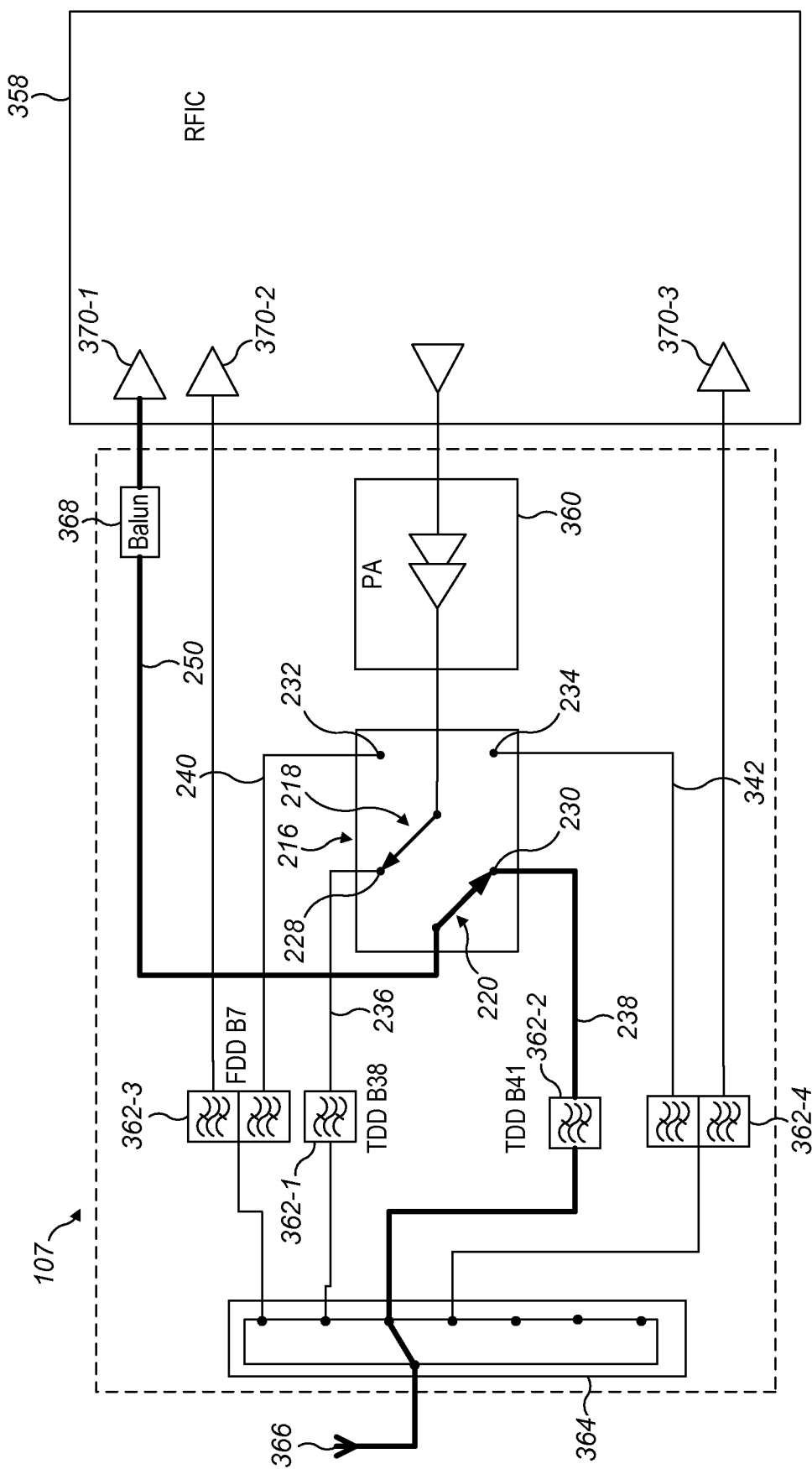

FIG. 3d shows the RF FE 107 configured for an LTE TDD receive operation in frequency band 41 (TDD B41). TDD B41 receive mode is similar to TDD B38 receive mode described above except that the second switch 220 is connected to second contact point 230 in order to send signals received along the second TDD communication path 238, via the receiver path 250 and to the balun 368, whilst first switch 218 is either in a disconnected position, connected to a contact point 228, 232, 234 other than the second contact point 230, or connected to an isolation connection point (not shown), or isolation is arranged with switch in series (not shown).

Figure 3E:
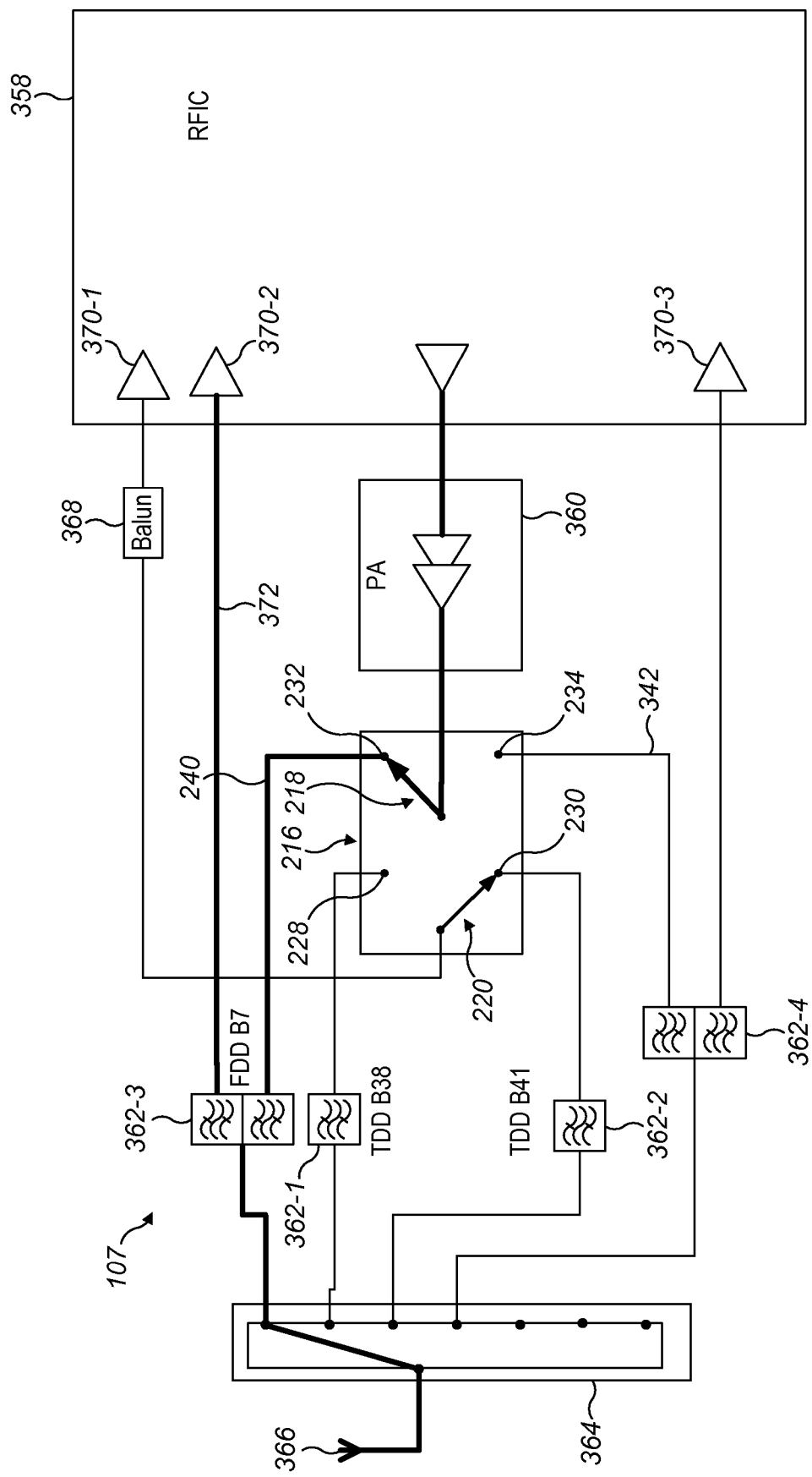

FIG. 3e shows the RF FE 107 configured for a LTE FDD operation in frequency band 7 (FDD B7). FDD B7 has a frequency allocation for downlink signal transmissions of between 2620 MHz and 2690 MHz and a frequency allocation for uplink signal transmissions of between 2500 MHz and 2570 MHz. The RFIC 358 generates a RF signal for transmitting in the FDD B7 mode and sends it to the power amplifier 360. The power amplifier 360 amplifies the transmission signal, which is then passed on to the switch arrangement 216. The switch arrangement 216 receives a control signal from the RFIC 358 which tells the switch arrangement 216 the mode and band of operation so that the switch arrangement 216 can be appropriately configured and so that the transmission signal can be routed to the correct communication path (i.e. the first FDD communication path 240). As such, the first switch 218 is positioned to connect with the third contact point 232 and the second switch 220 is positioned in either a disconnected position (i.e. not connected to any contact points), connected with either of the first contact point 228 or the second contact point 230, or connected to an isolation connection point (not shown), or isolation is arranged with switch in series (not shown). The transmission signal is then passed to the FDD B7 duplexer 362-3 for filtering. The filtered transmission signal then passes to the antenna switch module 364, which routes the filtered transmission signal to the antenna 366 for transmission. The antenna switch arrangement 364 receives a control signal from the RFIC 358 to indicate to the antenna switch arrangement which communication path (i.e. the first FDD communication path 240) is to be connected to the antenna in dependence on the mode and band of operation. When receiving a FDD B7 signal, the antenna 366 receives the reception signal and conveys it to the antenna switch module 364 for routing to the FDD B7 duplexer 362-3. The reception signal is then passed via a dedicated FDD receiver path 372 to the RFIC 358 for processing.

Figure 3F:
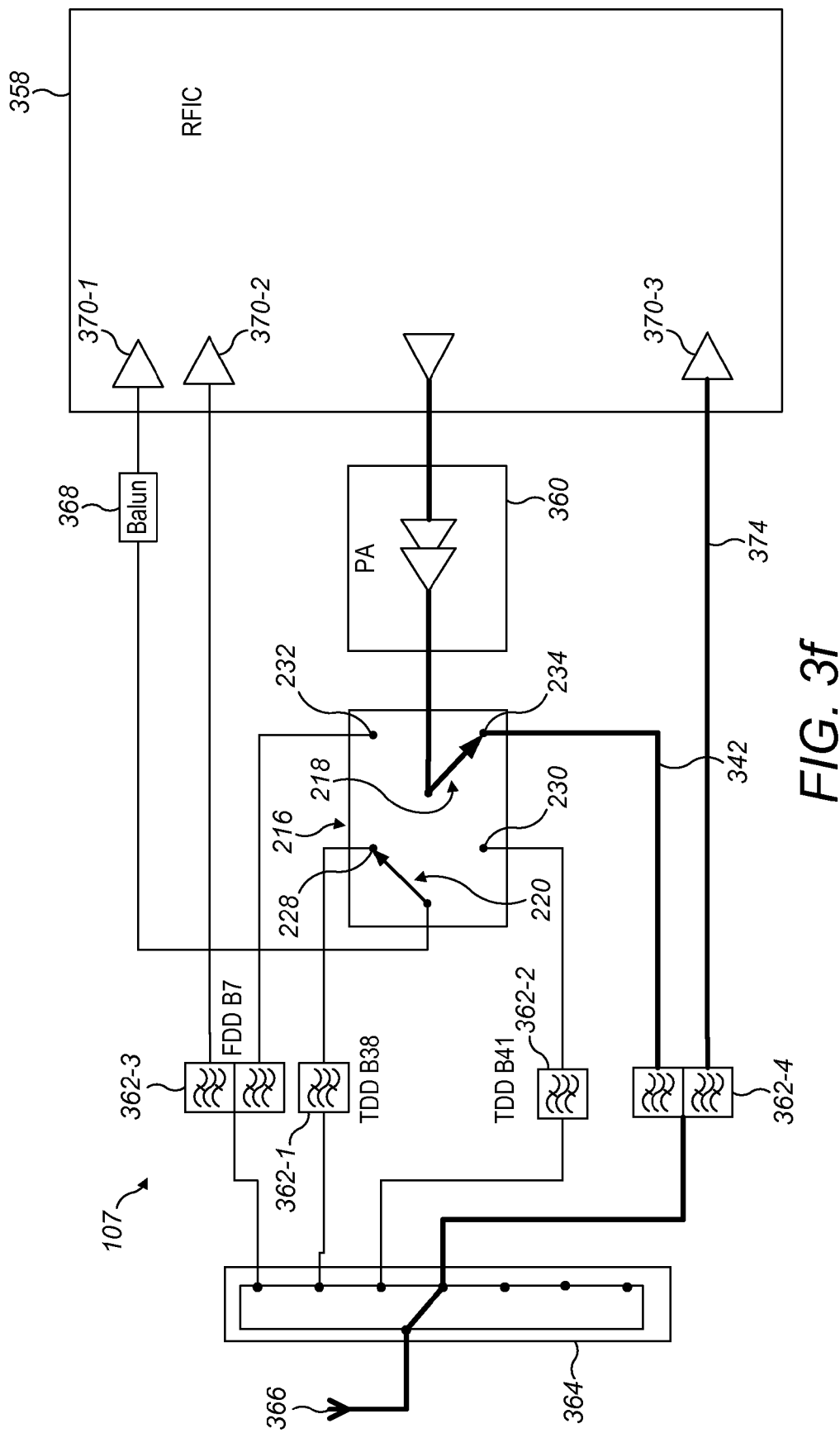

FIG. 3f shows the RF FE 107 configured for a FDD operation using duplexer ports 362-4. This FDD operation is characteristic of a band other than FDD B7 shown in FIG. 3e. The FDD transmit operation is similar to FDD B7 transmit operation described with reference to FIG. 3e except that the first switch 218 is connected to fourth contact point 234 in order to transmit signals along the fourth communication path 242, whilst the second switch 220 is either in a disconnected position or connected to either of the first contact point 228 or the second contact point 230. The FDD operation uses duplexer ports 362-4 to filter radio frequency signals in both the transmit and receive directions. Dedicated FDD receiver path 374 is used to pass received signals via a third LNA 370-3 to the RFIC 358.

Figure 3G:
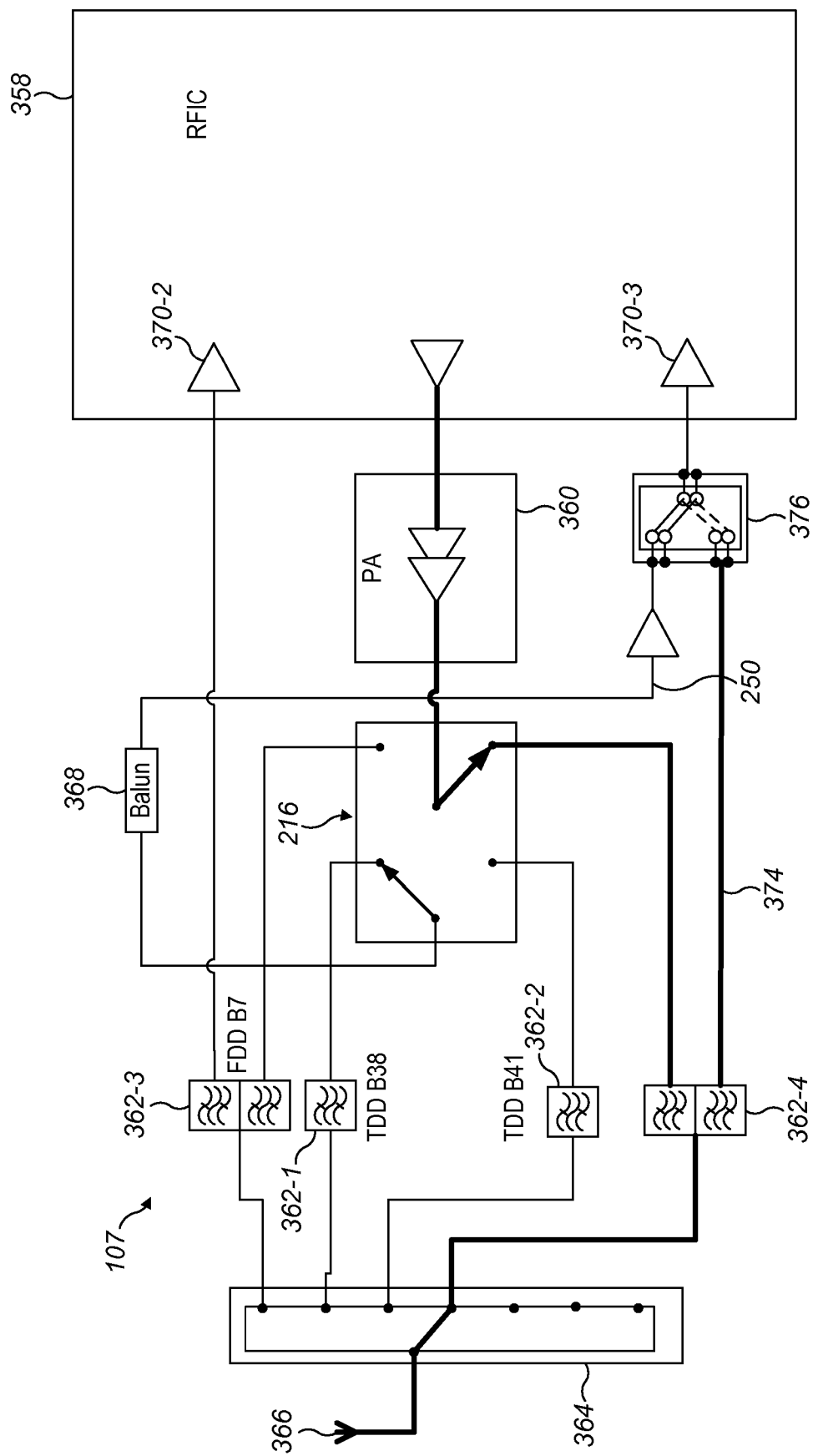

As shown in FIG. 3g, a switching component 376 can be used to combine the FDD receiver path 374 and the receiver path 250 so that a single low noise amplifier 370-3 is shared for both of these FDD and TDD modes. In general, the switching component may be used to combine two or more FDD and/or TDD modes to a common LNA. Signal lines to LNA may be balanced or single ended and switching component is selected according to designed circuit functionality.

In some exemplary embodiments of the present invention, a split-band frequency selective filtering solution can be used to allow maximum use of a bandwidth allocation for a mode of operation. For example, two split-band filters may have overlapping frequency responses in a predefined frequency range (e.g. 10 MHz, 20 MHz) in order to optimally utilize the whole frequency bandwidth allocated for communications according to a specified mode of operation. In a TDD mode of operation having a TDD B38 frequency allocation range of between 2570 MHz and 2620 MHz) two or more a TDD split-band filters can be used. The TDD split-band filter comprises a first TDD mode frequency selective filter and a second TDD mode frequency selective filter configured to allow frequencies within the allocated bandwidth or frequency range to pass through and prevent/attenuate the passing of signals having frequencies outside of this range. The first and second ranges of the TDD split-band filter have overlaps in order to maximize the use of the frequency bandwidth (BW) allocated for communications in these modes of operation. The frequency responses of the filters may be altered according to signal carrier frequencies and bandwidths of the associated modes of operation. The frequency selective filters may be single filters, duplexers, triplexers, and so on. TDD uplink and downlink may be arranged at same frequency or TDD uplink and downlink may have predefined frequency offset.

Although the first and second exemplary embodiments show switch arrangements for single modes of operation, it will be appreciated that various combined modes of operation are possible in order to provide simultaneous transmit and receive operations. For example, carrier aggregation (CA) operations can be performed using the switch arrangement 216 or similar switch arrangements.

FIGS. 4a to 4d show various circuit arrangements in a second example of a wireless device according to an embodiment of the invention. In particular, these figures show switch arrangements being configurable to selectively enable various non CA and CA operations.

Figure 4A:
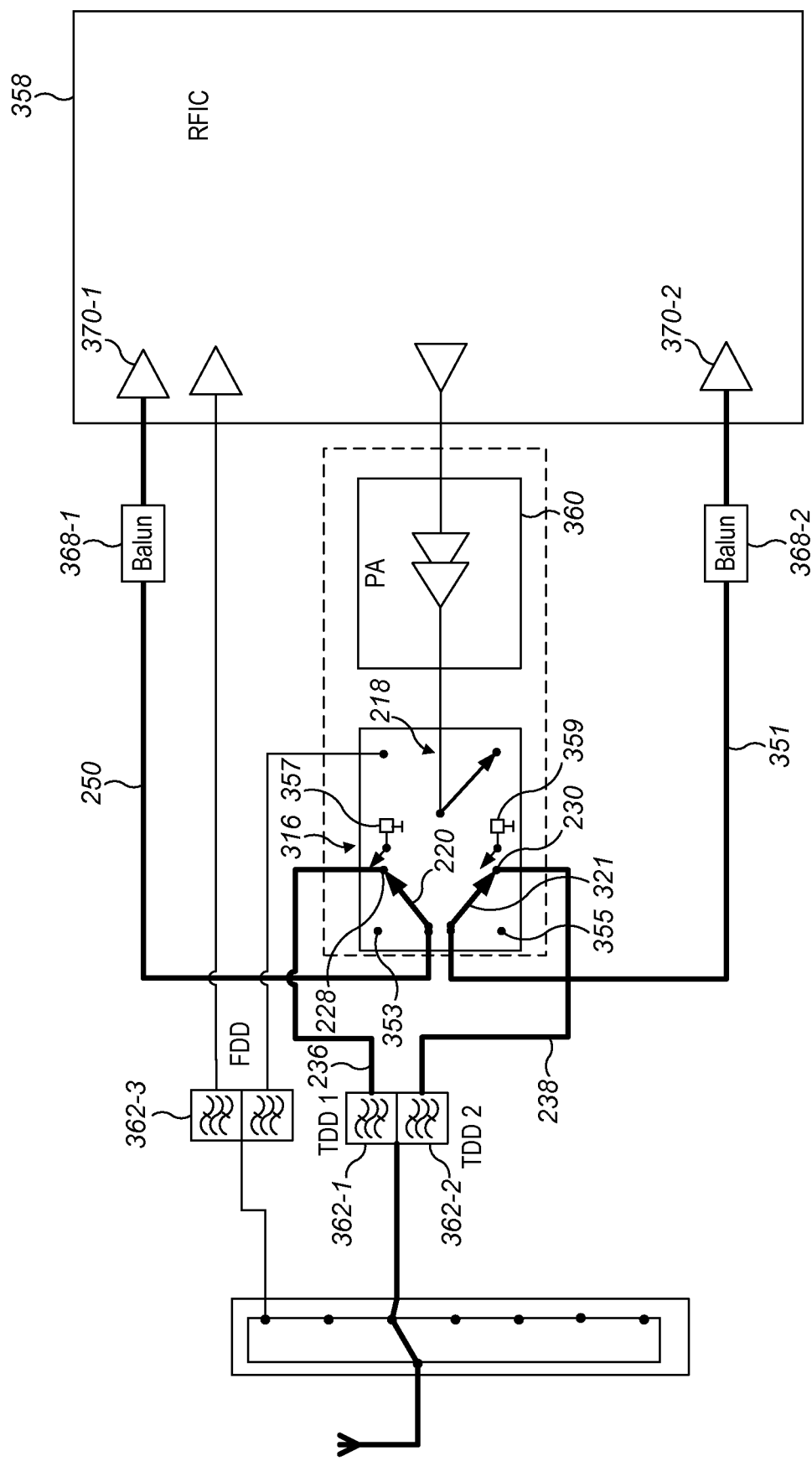
FIGS. 4a to 4d show schematic circuit diagrams of different operations of a second example of a wireless device according to an embodiment of the present invention.

FIG. 4a shows a circuit arrangement including the switch arrangement 316 of FIG. 2b, which is configured to simulta-neously provide a first TDD receive mode and second TDD receive mode of operation in a TDD CA operation. Both the first TDD receive mode and the second TDD receive mode use a duplexer 362, which comprises a first frequency selective filter 362-1 for a first carrier component (i.e. associated with the first TDD receive mode) and a second frequency selective filter 362-2 for a second carrier component (i.e. associated with the second TDD receive mode). In this example, the switch arrangement 316 is arranged to connect the second switch 220 to the first communications path 236 so as to enable reception of communications in the first TDD mode to be passed to via the first frequency selective filter 362-1 to the first receiver path 250. The received communications are then passed via a first balun 368-1 to a first LNA 370-1. At the same time, the switch arrangement 316 is arranged to connect the third switch 321 to the second communication path 238 so as to enable reception of communications in the second TDD mode to be passed via the second frequency selective filter 362-2 to the second receiver path 351. The received communications are then passed via a second balun 368-2 to a second LNA 370-2. In some examples, an LNA input adaptive arrangement is not needed when LNA input and PA output have equal number of inputs and outputs. The switch arrangement 316 comprises a first terminator 357 and a second terminator 359. The first terminator 357 and the second terminator 359 are arranged to cooperate with the first contact point 228 and the second contact point 230 respectively and use impedance matching to minimize RF signals from being reflected at these points. In particular, when either the first contact point 228 or the second contact point 230 is not used to form an active connection, the respective terminator 357, 359 associated with that contact point 228, 230 can be used to minimize any RF signals at that contact point 228, 230 from being reflected. The terminators 357, 359 thereby act to minimize any interference to signal transmissions as a consequence of reflected RF signals. The impedance matching of each terminator 357, 359 may be controllable according to one or more selected characteristics. For example, the impedance matching may be controlled according to characteristics such as the communication frequency, the frequency bandwidth of the selected mode of operation and/or the type of configured mode of operation. In this particular example configuration, as both the first contact point 228 and the second contact point 230 are used to form connections, the terminators 357, 359 are not required and therefore not active.

Figure 4B:
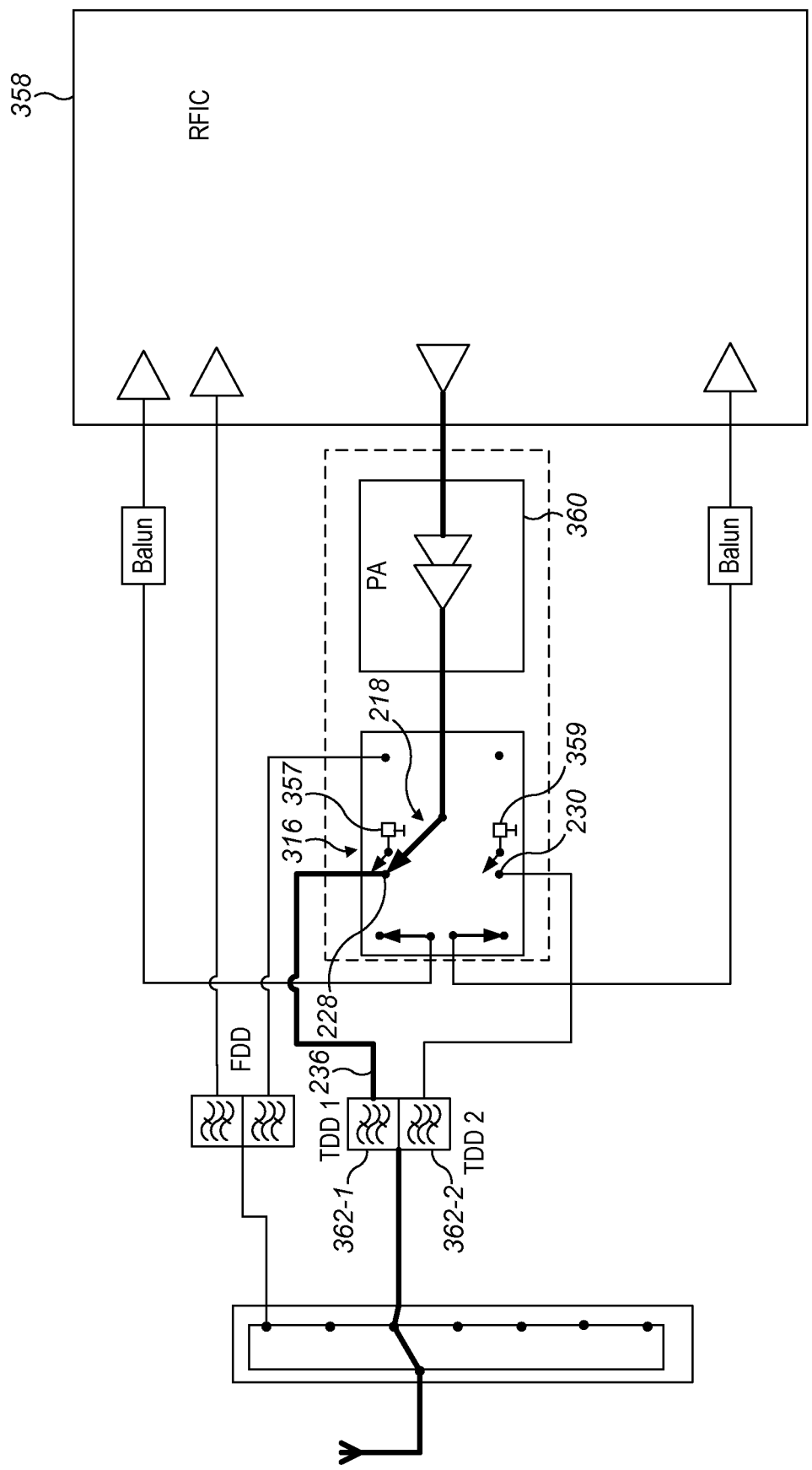

FIG. 4b shows the switch arrangement 316 configured to provide a TDD transmit operation for transmitting signals via the first frequency selective filter 362-1. In this example, the first switch 218 is configured to connect with the first contact point 228 so that signals from the PA 360 can be transmit via the first communication path 236 and to the TDD filter 362. The first terminator 357 is not activated in this example as the first contact point 228 is in use. However, as RF signals can still be received at the second contact point 230 from the second frequency selective filter 362-2, it is preferable that a reflection of those signals is prevented or minimized so as to avoid interference of the reflected signals with the transmit signals. The second terminator 359 is therefore made active to minimize the reflection of RF signals.

Figure 4C:
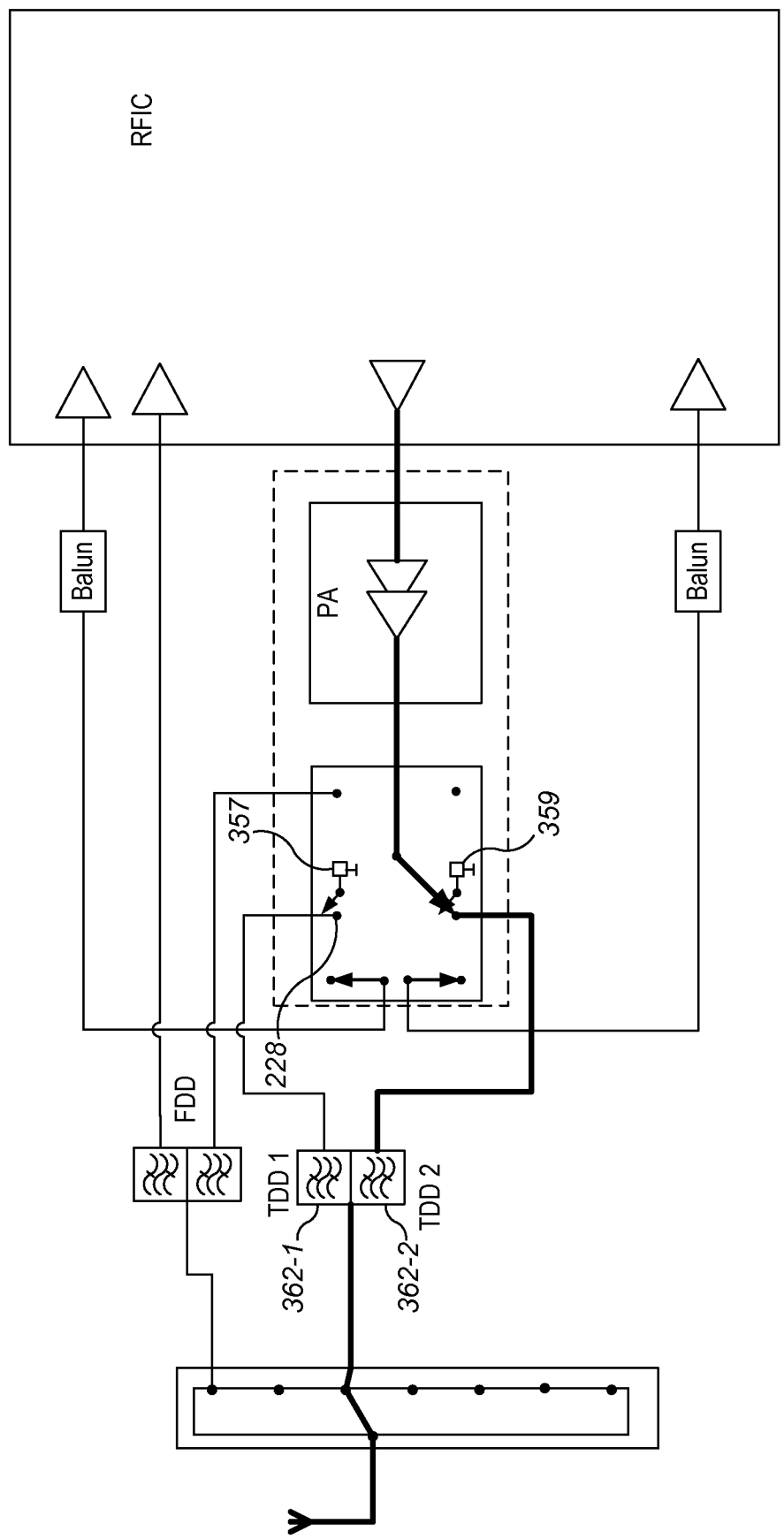

FIG. 4c shows the switch arrangement of FIG. 4b configured to provide a TDD transmit mode for transmitting signals using the second frequency selective filter 362-2. The first terminator 357 is made active to prevent or minimize the reflection of any RF signals from the first contact point 228.

Figure 4D:
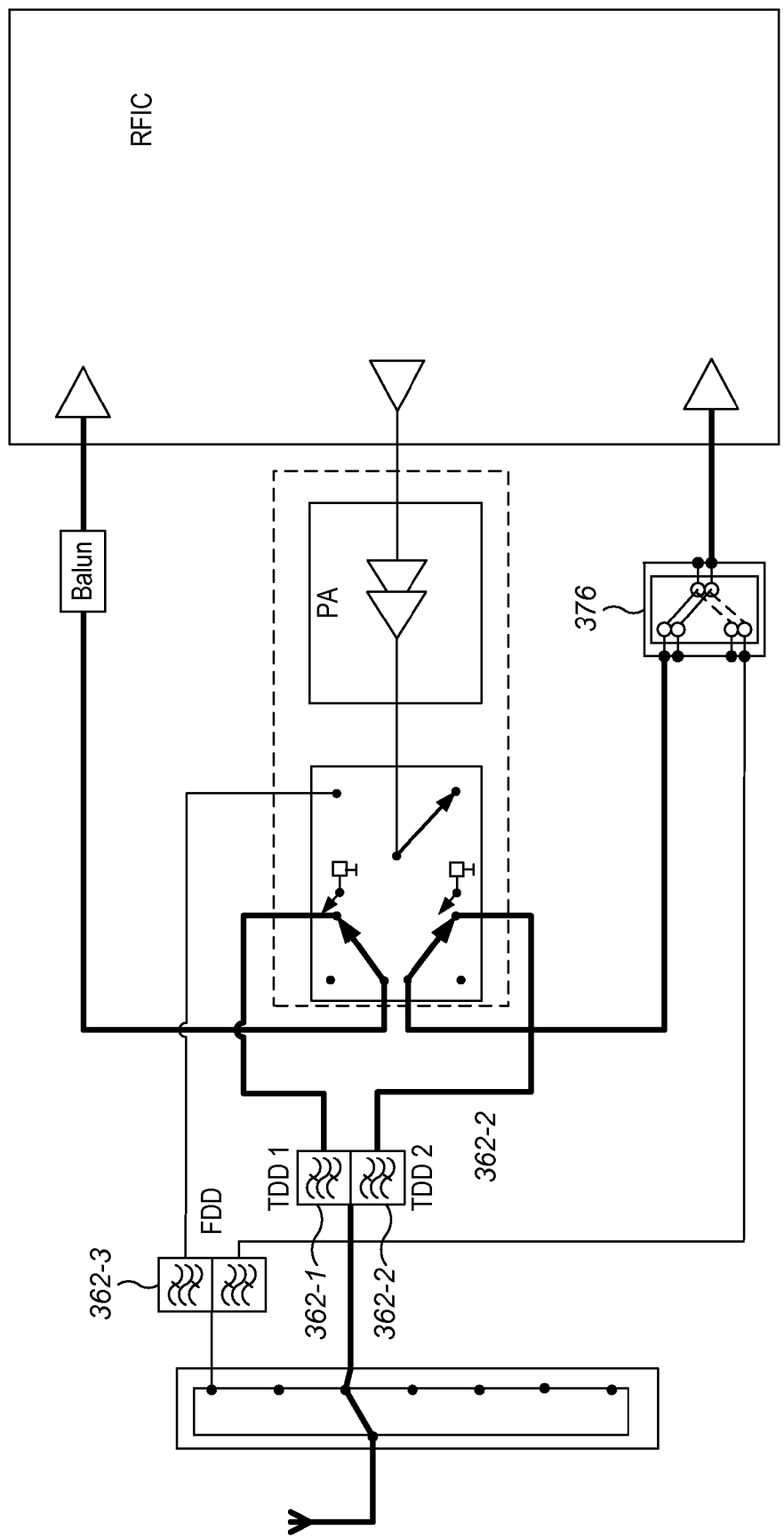

FIG. 4d shows a switch arrangement configured to provide a first TDD receive mode and second TDD receive mode of operation in a TDD CA operation similar to that shown in FIG. 4a, except that a switching component 376 is used to receive signals from one of the second frequency selective filter 362-2 and a FDD duplexer 362-3 (associated with a FDD receive mode of operation). In other examples, the switching component is arranged to receive signals for each receive mode of operation.

FIGS. 5a to 5d show schematic circuit diagrams of different operations of a third example of a wireless device according to an embodiment of the present invention. The circuit arrangements may be used for TDD and FDD CA operations. In each of these arrangements, the antenna switch module 364 has two contact points or nodes simultaneously connected to the antenna 366 so as to enable the carrier aggregation operation. The connection of contact points to the antenna 366 is responsive to a control signal received from the RFIC 358. The RFIC 358 thereby selects appropriate contact points of the antenna switch module 364 that are associated with the communication paths, communication path matching circuitry (not shown) and filters that are being used to perform the CA operation.

Figure 5A:
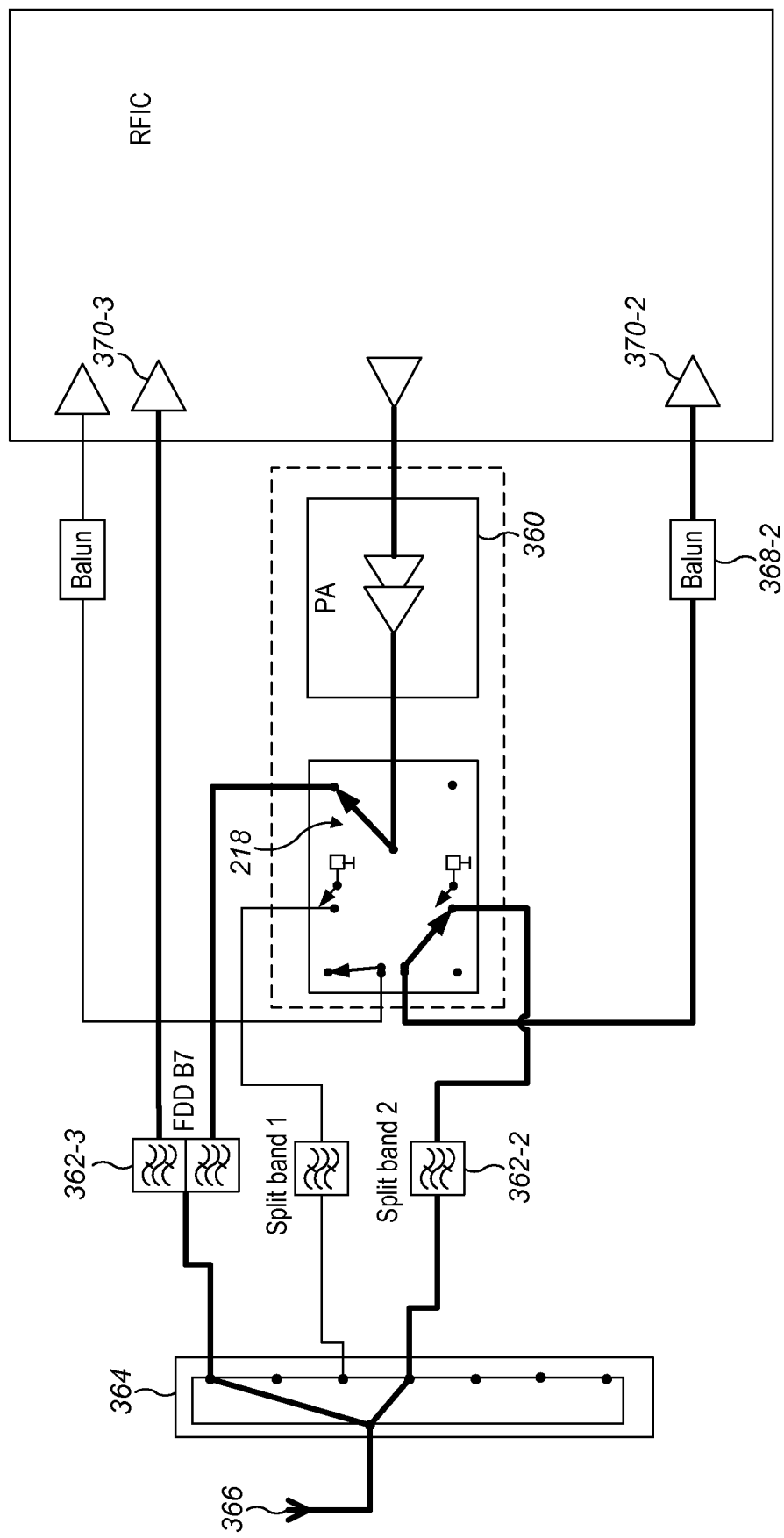
FIGS. 5a to 5d show schematic circuit diagrams of different operations of a third example of a wireless device according to an embodiment of the present invention.

FIG. 5a shows a FDD and TDD CA circuit arrangement, whereby the switch arrangement is configured to enable the RF FE 107 to simultaneously allow a FDD B7 transceiver operation and a TDD B38 receive operation to be performed. In the FDD B7 transceiver mode, the FDD filter 362-3 is used to allow two-way signal communications and also to enable a filtering of RF signals in both directions. The first switch 218 is configured to connect the output of the PA 360 to the FDD B7 duplexer 362-3 to form at least a part of a FDD transmitter chain. A dedicated FDD receiver path (i.e. one which is dedicated to receiving radio frequency signals in a FDD B7 mode and does not use the switch arrangement) is used to convey received signals to the third LNA 370-3 so as to form at least a part of a FDD receiver chain. The TDD B38 receive operation uses a second frequency selective filter 362-2. The switch arrangement is arranged to connect the second frequency selective filter 362-2 via the second balun 368-2 to a second LNA 370-2.

Figure 5B:
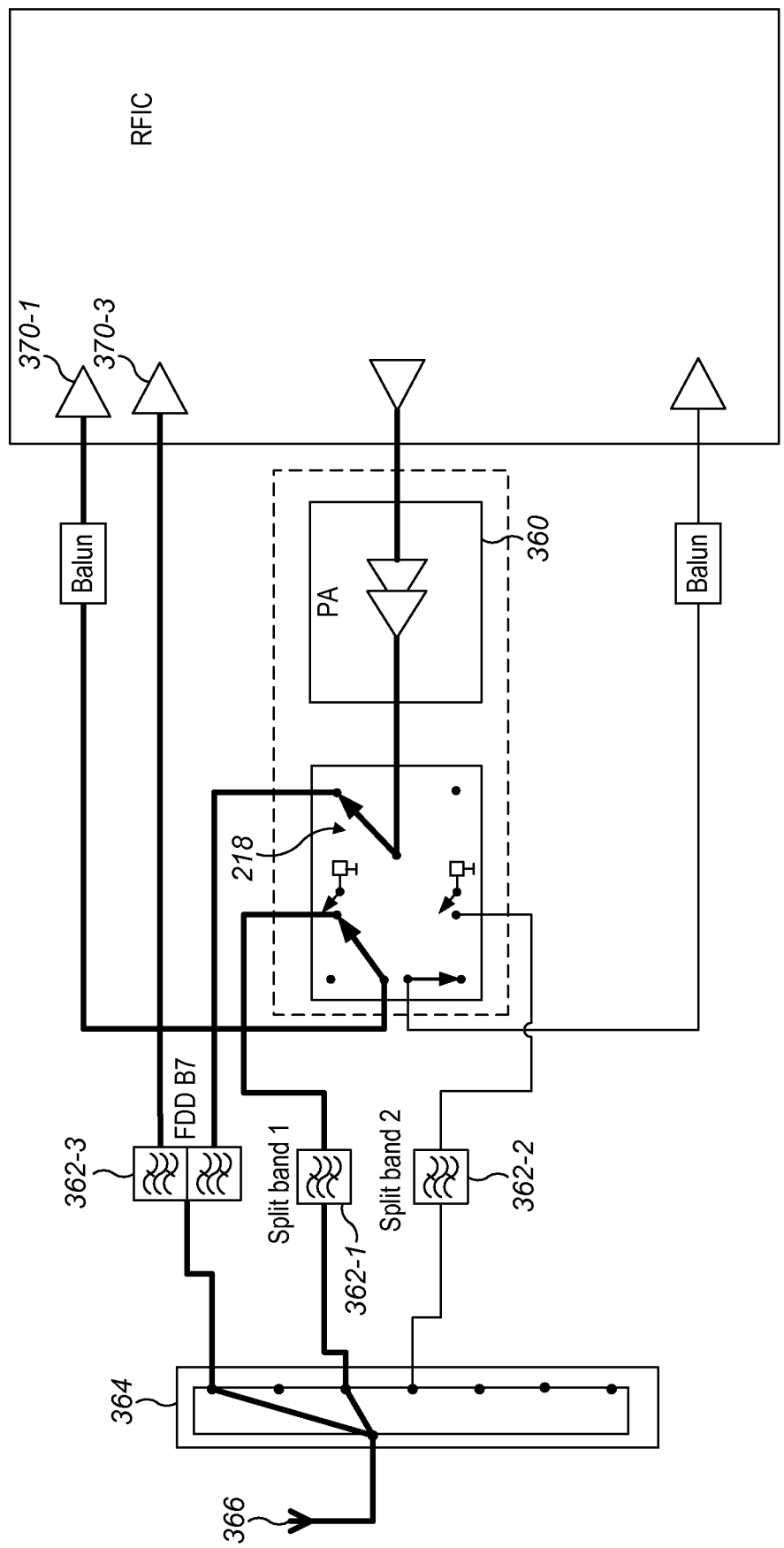

FIG. 5b shows a FDD and TDD CA circuit arrangement, similar to that shown in FIG. 5a, except that the switch arrangement 316 is configured for the TDD receive mode of operation and uses the first frequency selective filter 362-1, the first balun 368-1 and the first LNA 370-1 rather than the second frequency selective filter 362-2, the second balun 368-2 and the second LNA 370-2.

Figure 5C:
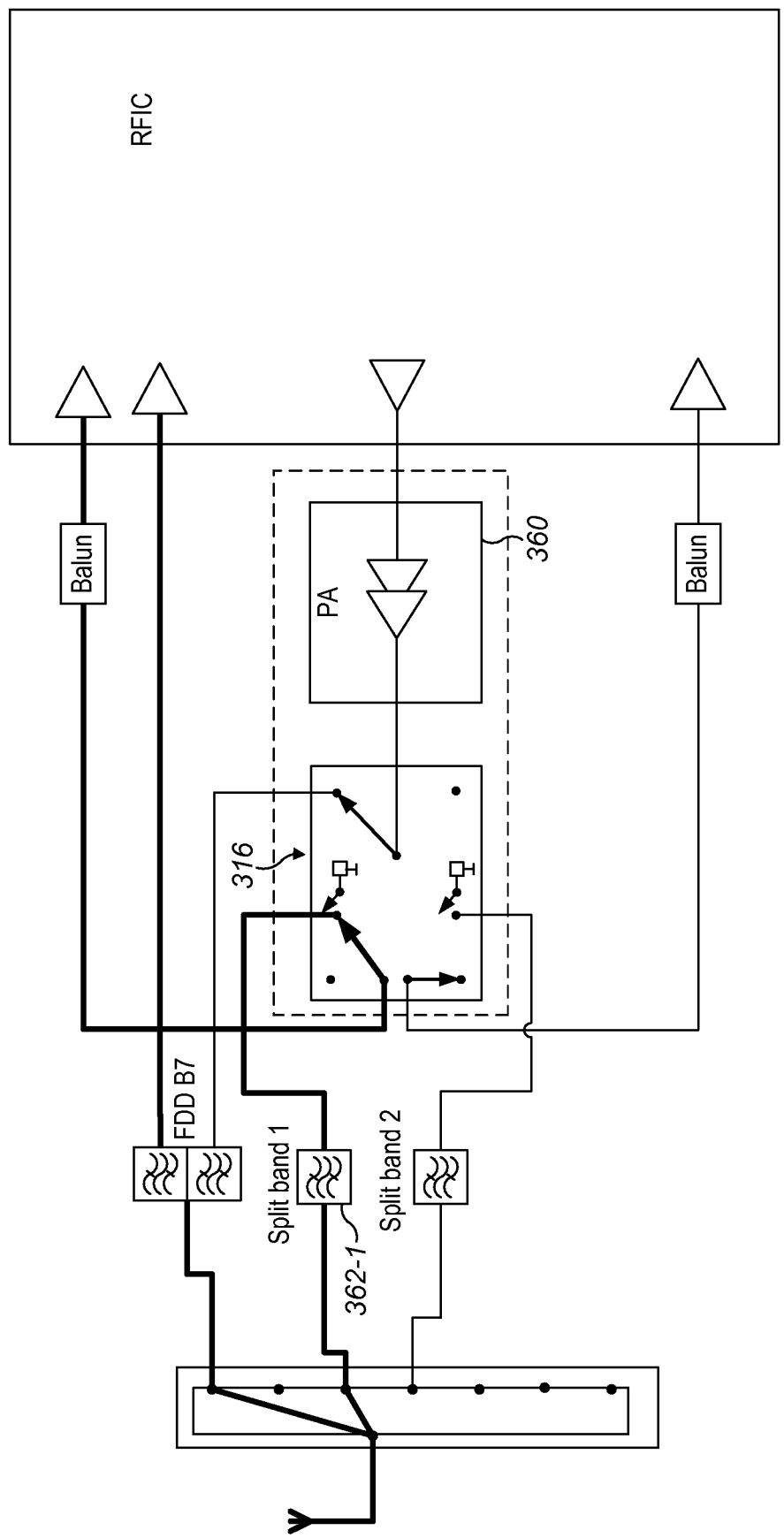
Figure 5D:
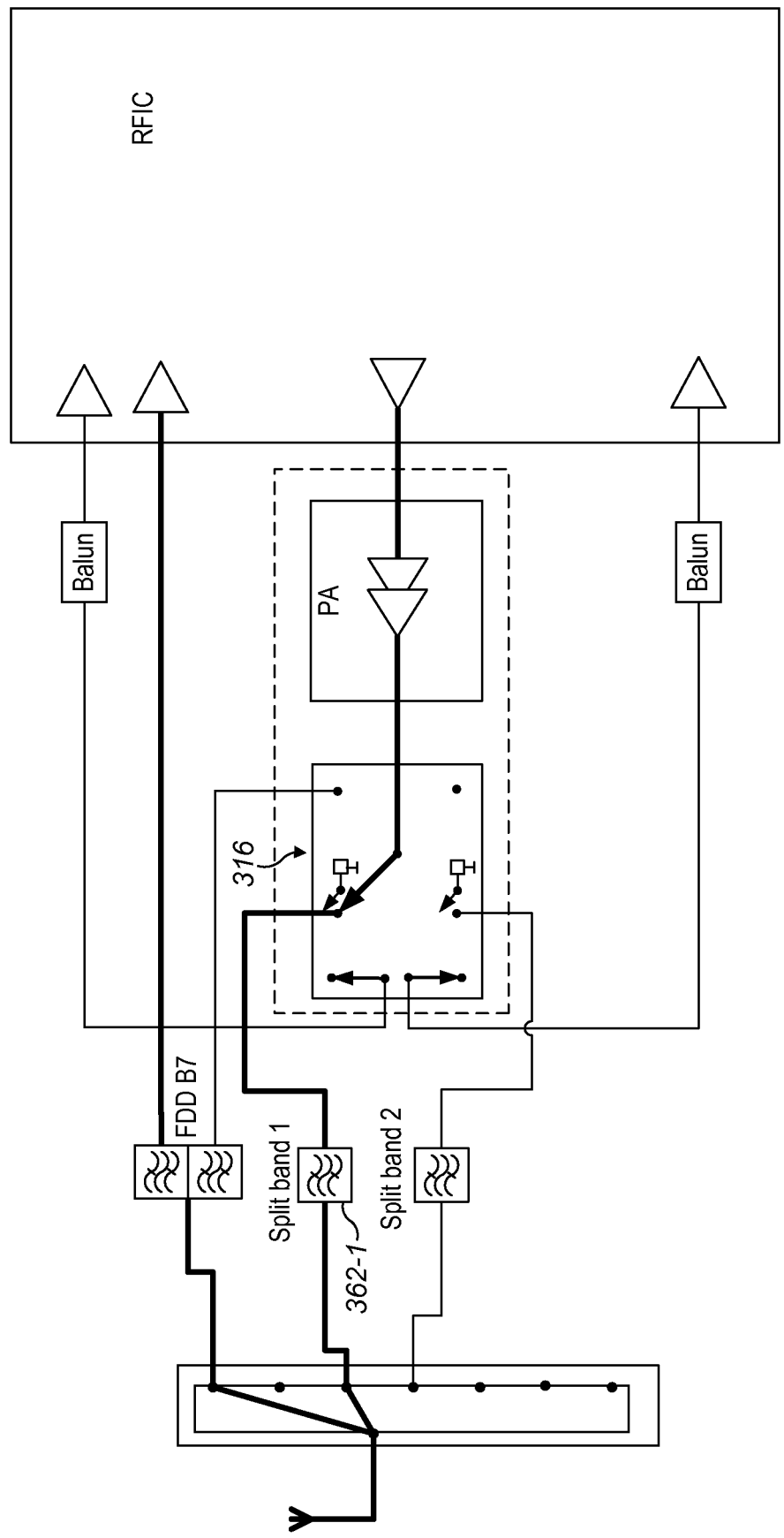

FIGS. 5c and 5d show a FDD and TDD CA circuit arrangement, whereby a FDD receive mode of operation is combined with a TDD transmit and receive operation. The configuration for the FDD and TDD receive operation is shown in FIG. 5c and the configuration for the FDD receive mode and TDD transmit operation is shown in FIG. 5d. Both the TDD receive operation and the TDD transmit operation use the first frequency selective filter 362-1. In this example, whilst the FDD B7 receive mode is active, the switch arrangement 316 alternates between the TDD transmit mode and the TDD receive mode.

In a fourth example of a wireless device according to an embodiment of the present invention, "multiple output filters" can be used to filter signal communications, such as those described in U.S. Pat. No. 8,188,809. For example, a double pole, double throw, triple filter (known as "2p2t3f" in U.S. Pat. No. 8,188,809) such as that shown schematically in FIGS. 6a to 6e can be used to provide varied frequency responses using a single integrated component without the need for switches. The need for a switch is removed due to each filter of the triple filter arrangement having a dedicated frequency response. The dedicated frequency response of each filter causes each filter to act as an isolation element for the various input signals to the arrangement so that each filter is isolated from an adjacent filter.

Figure 6A:
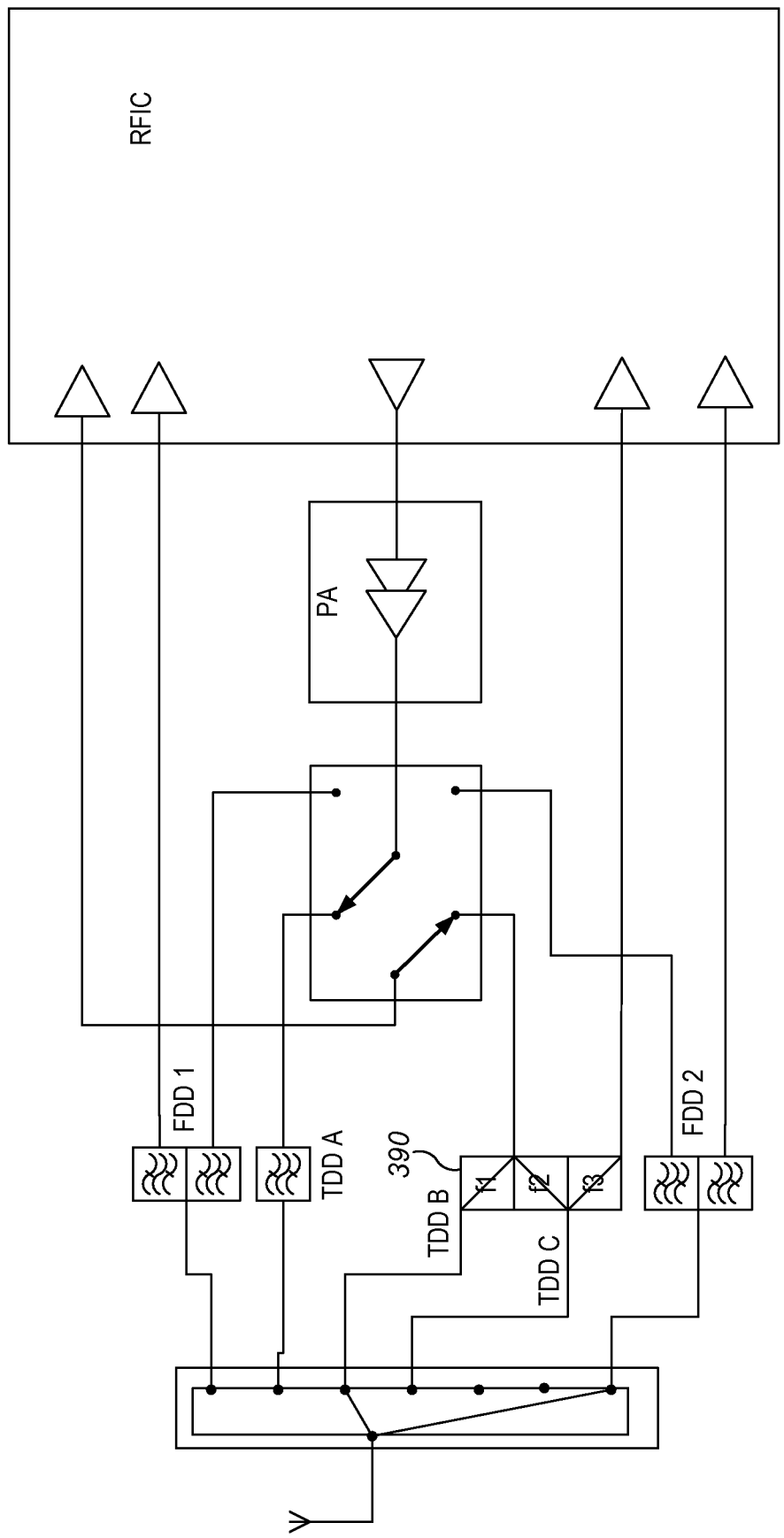
FIGS. 6a to 6e show schematic circuit diagrams of different operations of a fourth example of a wireless device according to an embodiment of the present invention.

FIG. 6a shows a circuit arrangement where a 2p2t3f component 390 is used. The 2p2t3f component 390 can provide various TDD modes of operation as a result of each filter having a different frequency response.

Figure 6B:
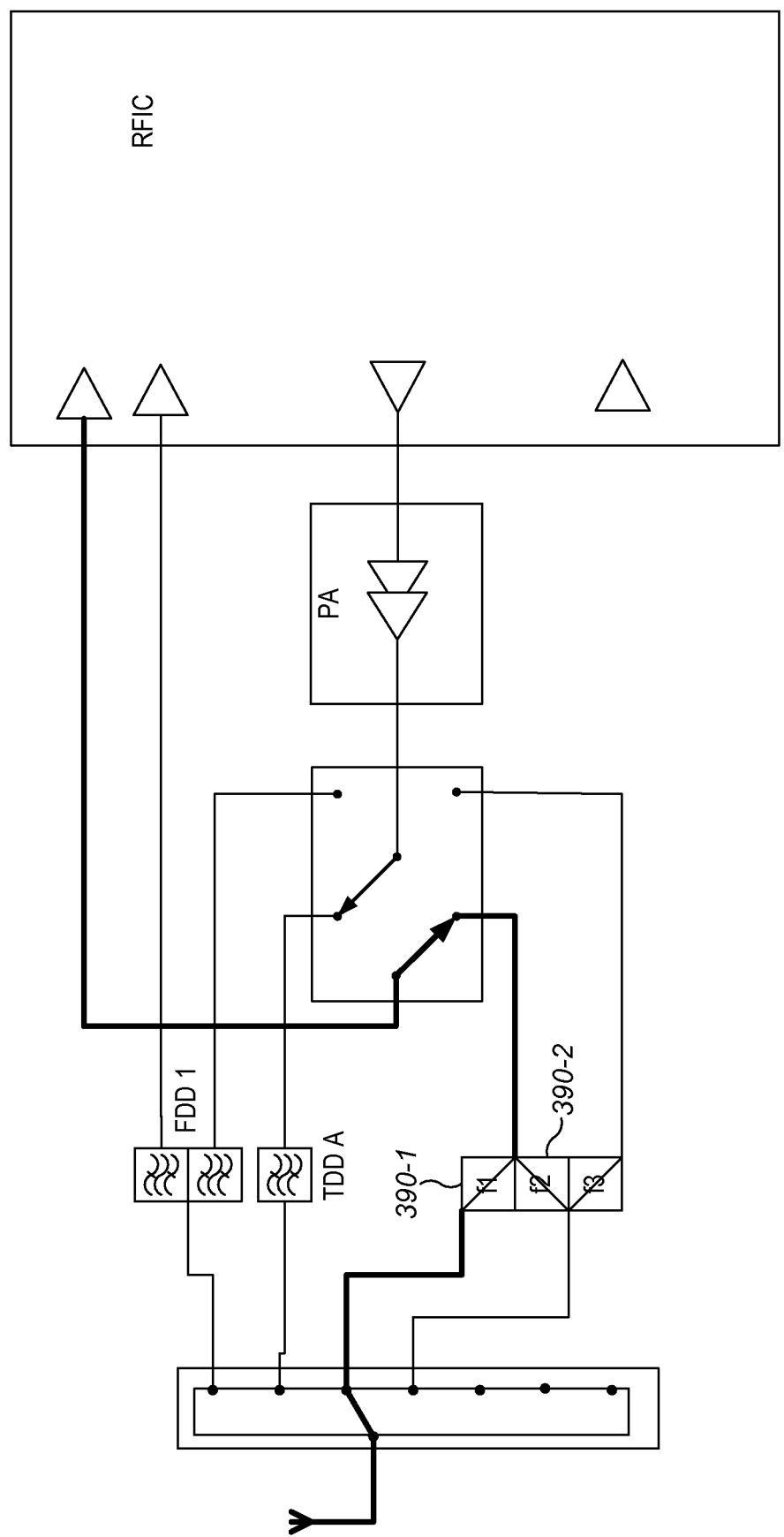

FIG. 6b shows the 2p2t3f component 390 being used in a first TDD receive mode of operation, whereby a first filter 390-1 of the 2p2t3f component 390 is used. The 2p2t3f component 390 can also be used in a second TDD receive mode of operation, whereby a second filter 390-2 of the 2p2t3f component is used.

Figure 6C:
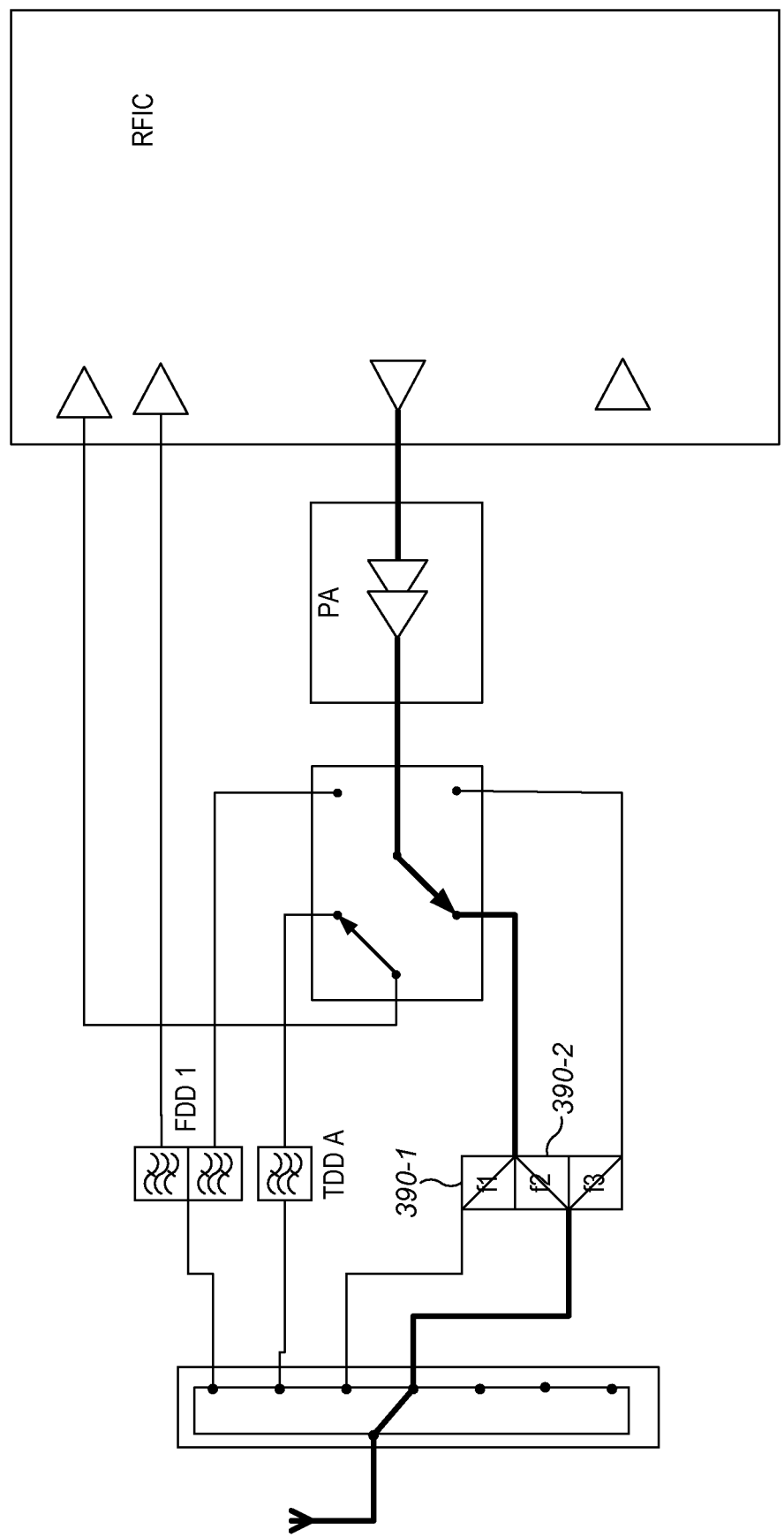

FIG. 6c shows a second filter 390-2 of the 2p2t3f component 390 being used for a second TDD transmit mode of operation. It is noted that a first TDD transmit mode of operation can be performed using the first filter 390-1 of the 2p2t3f component 390.

Figure 6D:
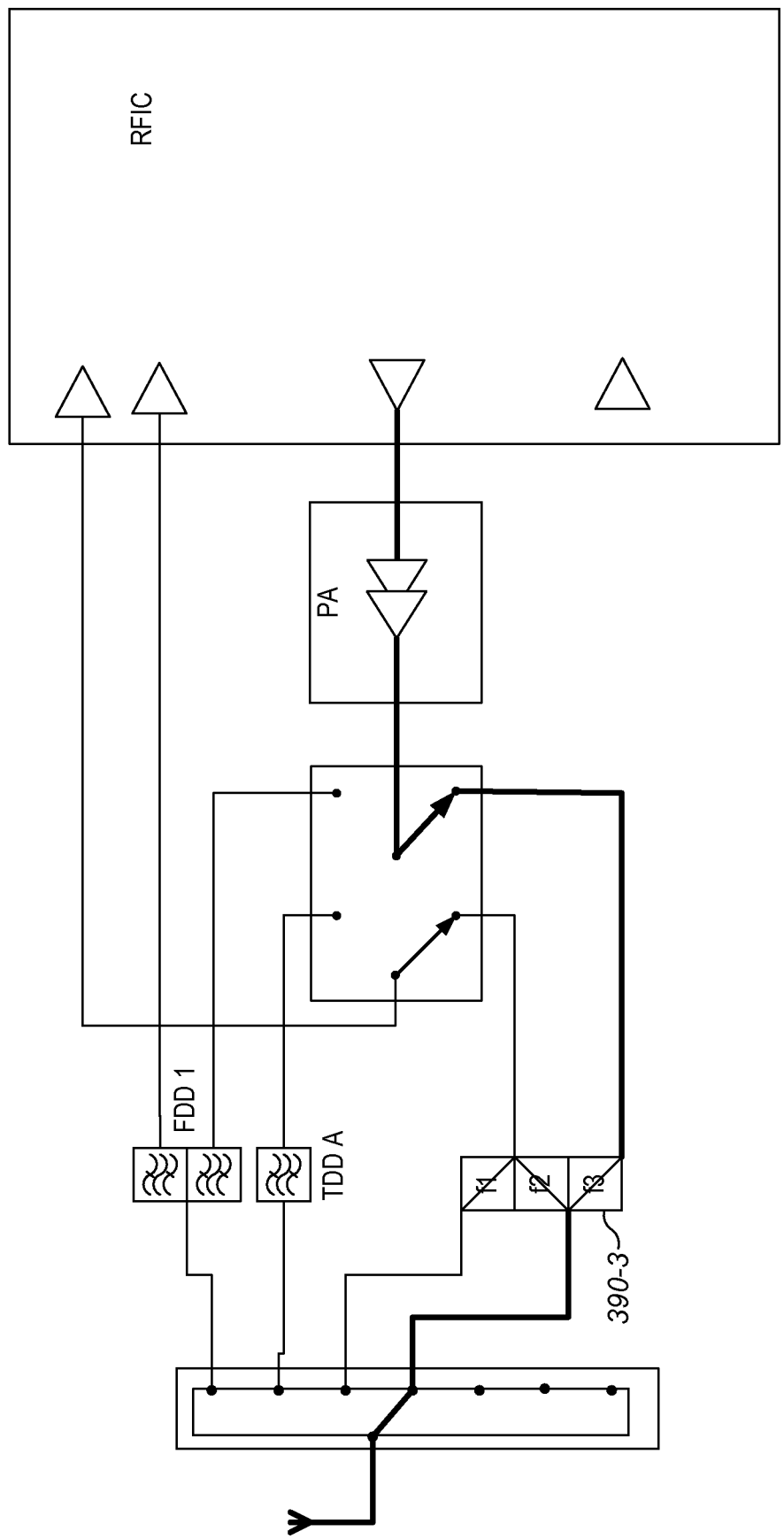

FIG. 6d shows a third filter 390-3 of the 2p2t3f component 390 being used for a third TDD transmit mode of operation.

Figure 6E:
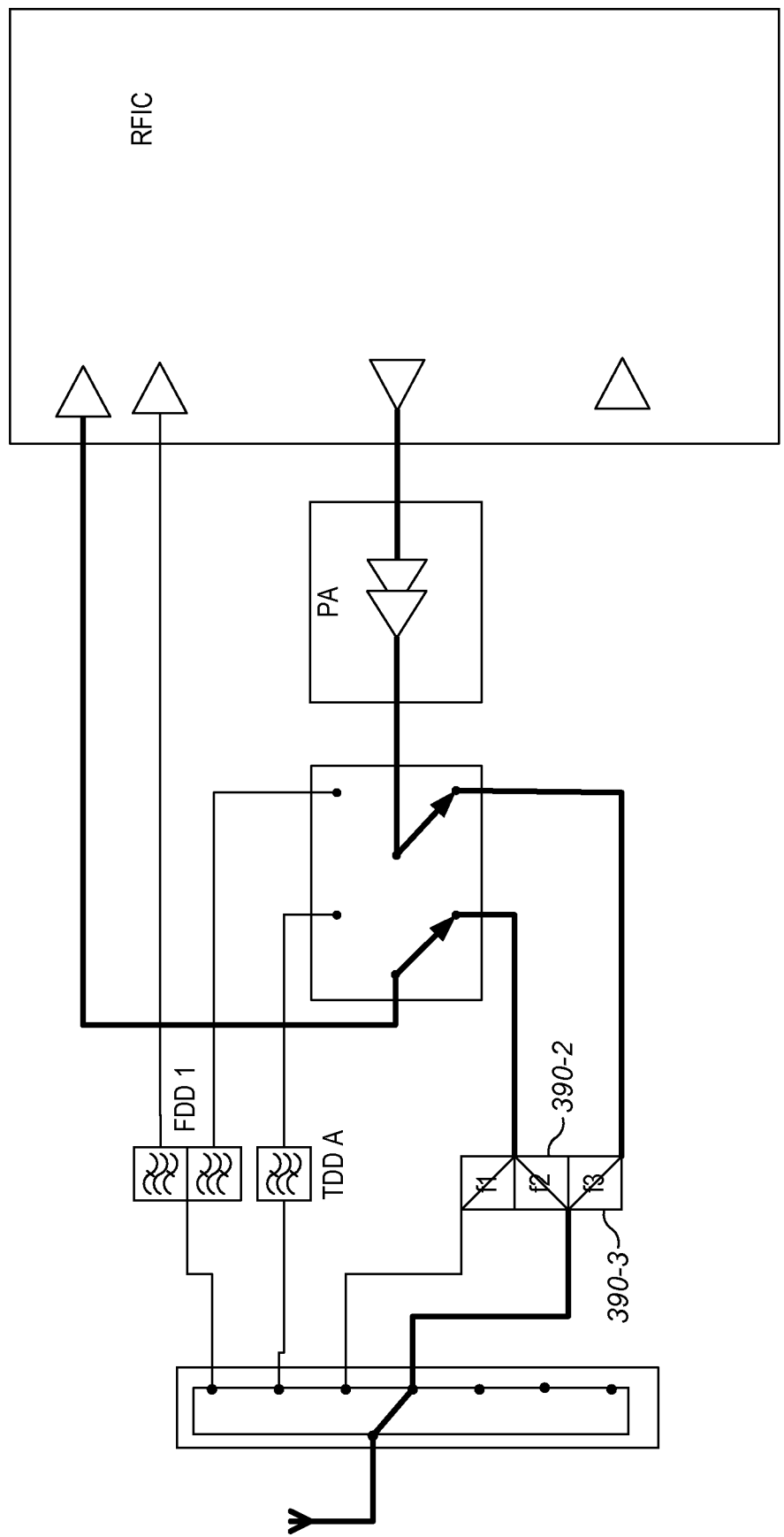

FIG. 6e shows a carrier aggregation operation whereby a TDD transmit operation uses the third filter 390-3 of the 2p2t3f component and a TDD receive operation uses the second filter 390-2 of the 2p2t3f component. As the second filter 390-2 has a different frequency response compared with the third filter 390-3, the signal communications through the 2p2t3f component for the different modes are isolated from each other.

It will be appreciated that guard bands can be provided in order to isolate the various channels (i.e. the channels associated with each of the modes of operation shown in FIGS. 3a to 6e) from one another. Guard bands are narrow frequency bands between adjacent channels in multiplexing that are kept unused to prevent the channels from overlapping and causing crosstalk among modulated signals.

Figure 7:
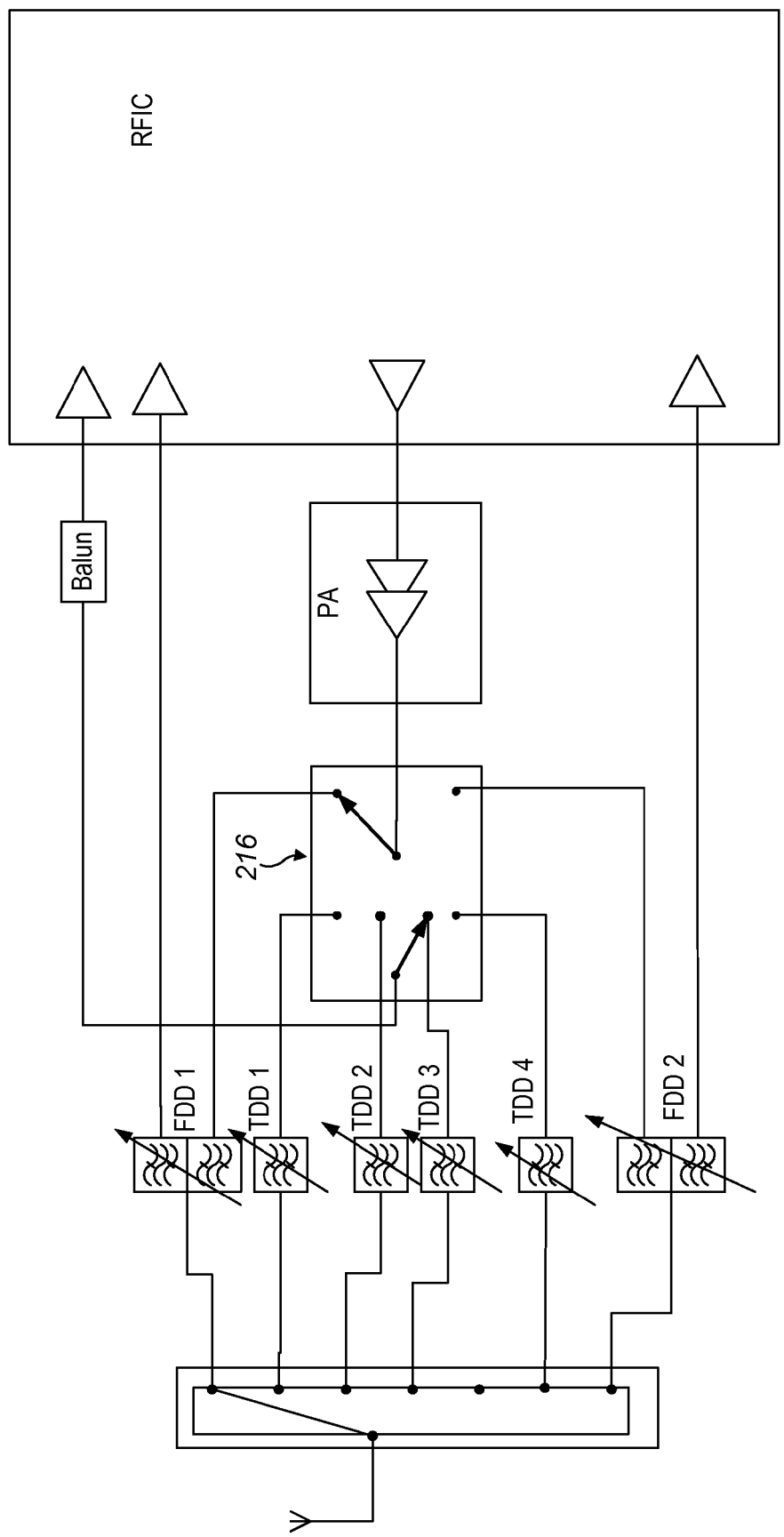
FIG. 7 shows a schematic circuit diagram of an operation of a fifth example of a wireless device according to an embodiment of the present invention.

In the above exemplary embodiments, specific examples of modes and frequency bands of operation were given, however it will be appreciated that various configurations are possible for different combinations of modes and frequency bands. Furthermore, fewer or additional modes and frequency bands of operation can be provided. As shown in FIG. 7, additional modes of operation can be added by adding further contact points, communication paths and filters for the switch arrangement. Thus, for each additional mode and band of operation, a further throw (i.e. additional contact point) may be added for the switch arrangement. Additional filters for each additional mode are also typically required in practice. Also, additional contact points for the antenna switch module are typically required so that the antenna switch module can connect the relevant communication path to the antenna. As such, the first switch and the second switch can each be a single pole, multiple throw switch with in general any number of throws corresponding with the number of modes and frequency bands of operation.

Figure 8:
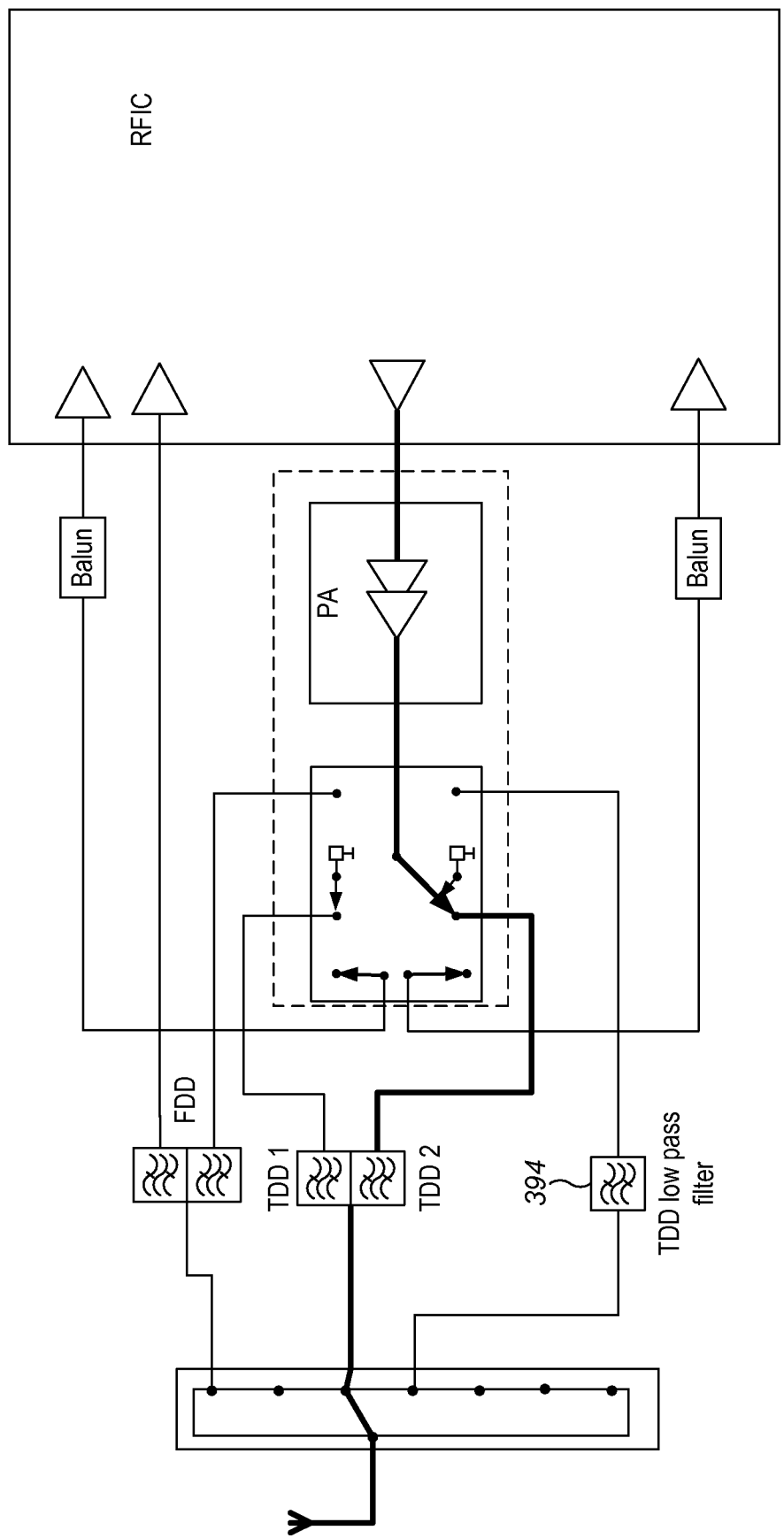
FIG. 8 shows a schematic circuit diagram of an operation of a sixth example of a wireless device according to an embodiment of the present invention.

In the above exemplary embodiments, band pass or split-band filters were used to filter signal communications so that only signal at the desired frequencies (desired component carrier or desired component carriers) were able to pass through the band pass filters. It will be appreciated that various other types of filters can be used and various combinations of different filters can be used. For example, as shown in FIG. 7, the frequency response of each filter can be altered/tunable. Also, as shown in FIG. 8, a low pass filter 394 can be used to filter harmonic frequencies of a band of operation that are not within that band. Duplexers and triplexers with filtering functionality may also be used.

Figure 9:
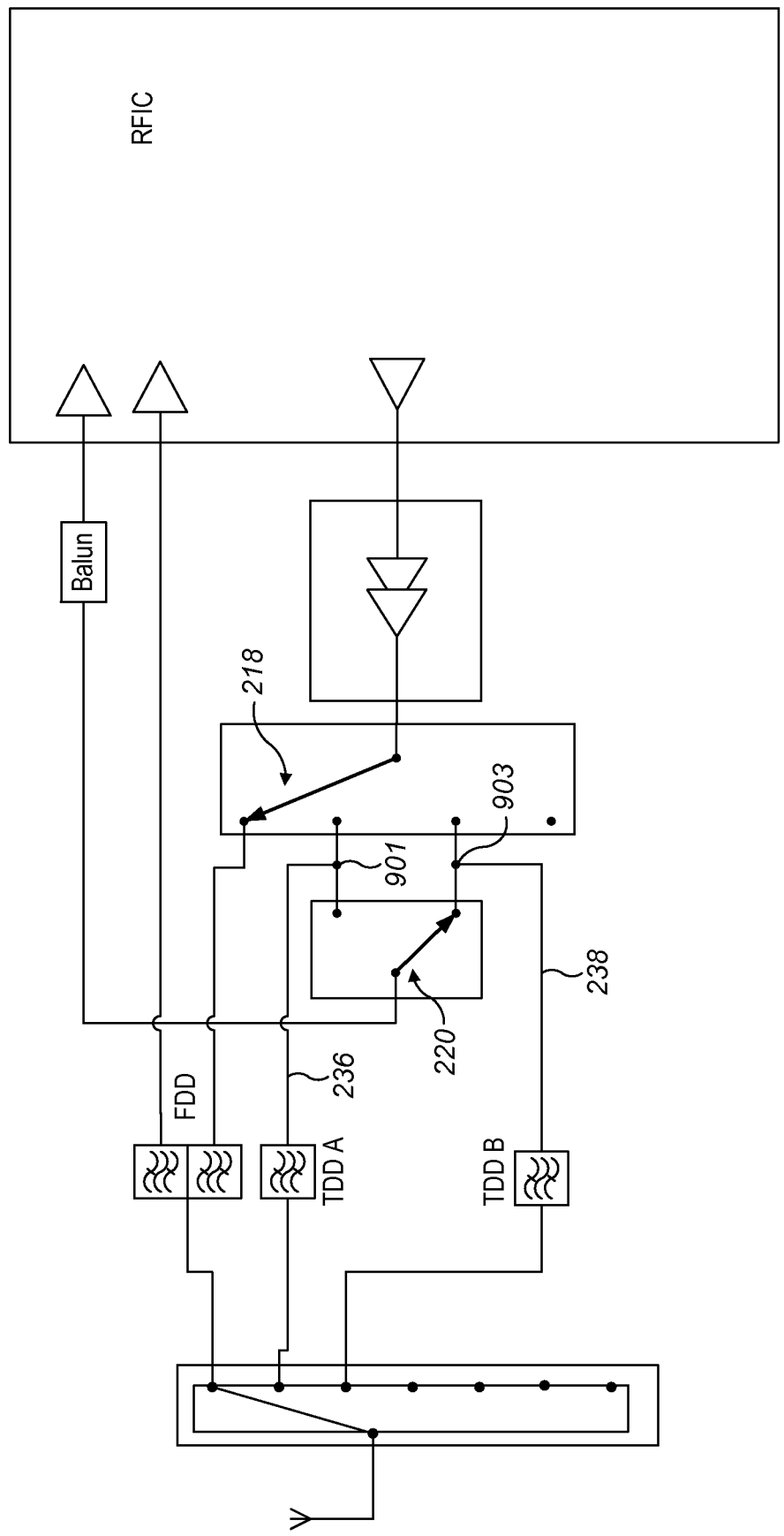
FIG. 9 shows a schematic circuit diagram of an operation of a seventh example of an embodiment of the present invention.

In the above exemplary embodiments, the first switch 218 and the second switch 220 are arranged to connect directly with the shared contact points. In alternative exemplary embodiments, and as shown in FIG. 9, the first switch 218 and the second switch 220 are independent from one another in that they do not connect directly with the shared contact points. Instead, the first switch 218 and the second switch 220 are coupled to intermediary contact points 901, 903. The intermediary contact points 901, 903 are arranged to connect to the shared communication paths 236, 238. Each of the first switch 218 and the second switch 220 may receive dedicated control signals indicating the configuration of each switch.

FIGS. 10*a* to 10*i* show schematic diagrams of various switch arrangements similar to the switch arrangement of FIG. 9. In each of these figures, the switch arrangements use intermediary contact points, which are common to both the first switch 218 and the second switch 220. The intermediary contact points are connected to shared communication paths (not shown). The intermediary contact points therefore allow connection of either or both of the first switch 218 and the second switch 220 to one or more shared communication paths. The first switch 218 has one or more contact points arranged to connect to one or more intermediary contact points. The second switch 220 has one or more contact points arranged to connect to the one or more intermediary contact points. When one of the switches 218, 220 connects with a contact point for communications via an intermediary contact point, the other switch 220, 218 is arranged to avoid connection with its contact point associated with that intermediary contact point. The contact point which is not connected to by the other switch 220, 218 is arranged to have a high impedance to minimize reflection of RF signals at that contact point. The contact points that are arranged to have a high impedance are illustrated in these figures as being circled.

Figure 10A:
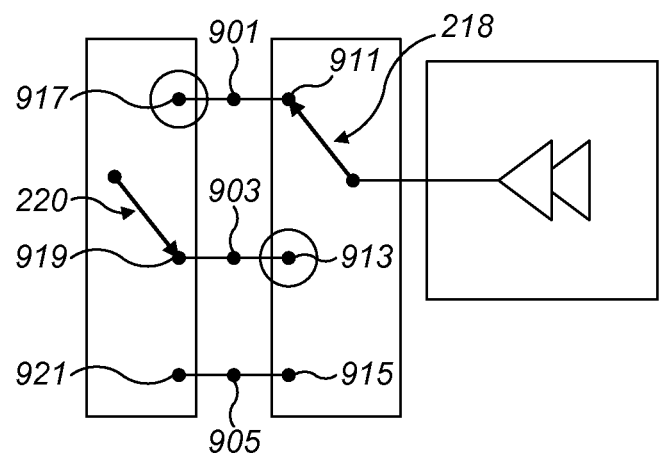
FIGS. 10a to 10i show schematic circuit diagrams of various examples of switch arrangements according to embodiments of the present invention.

FIG. 10*a* shows a switch arrangement comprising a first switch 218 selectively connectable to a first contact point 911, a second contact point 913 and a third contact point 915. The switch arrangement also comprises a second switch 220 selectively connectable to a fourth contact point 917, a fifth contact point 919 and a sixth contact point 921. The first contact point 911 and the fourth contact point 917 are connected to a first intermediary contact point 901. The second contact point 913 and the fifth contact point 919 are connected to a second intermediary contact point 903. The third contact point 915 and the sixth contact point 921 are connected to a third intermediary contact point 905. Each of the intermediary contact points 901, 903, 905 connect to a shared communication path (not shown) in accordance with a mode of operation. In this example, the first switch 218 is connected to the first contact point 911 and therefore the first intermediary contact point 901 can be used to convey communications to and/or from a shared communications path. As such, the second switch 220 avoids connection with the fourth contact point 917 which is associated with that first intermediary contact point 901. The fourth contact point 917 is arranged to have a high input impedance to minimize any reflection of RF signals at the fourth contact point 917. The second switch 220 is connected to the fifth contact point 919 and therefore the second intermediary contact point 903 can be used to convey communications to and/or from a shared communications path. As such, the first switch 220 avoids connection with the second contact point 913 which is associated with the second intermediary contact point 903. The second contact point 913 is arranged to have a high input impedance to prevent any reflection of RF signals at the second contact point 913.

Figure 10B:
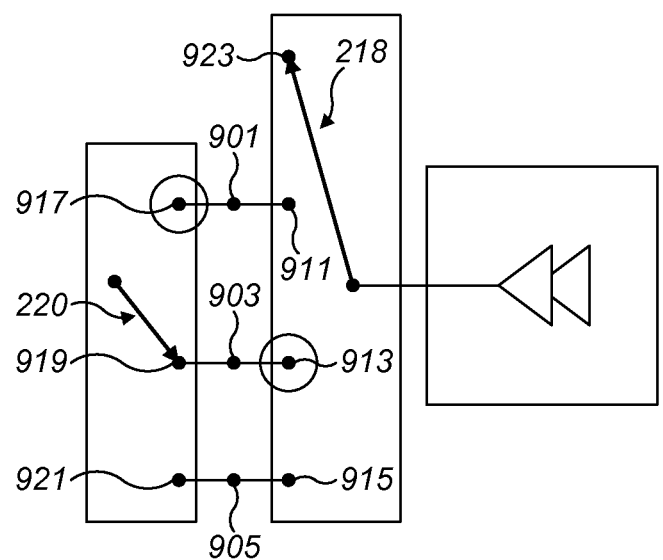

FIG. 10*b* shows a switch arrangement similar to that shown in FIG. 10*a*, except that the first switch 218 connects to a seventh contact point 923, such that the first intermediary contact point 901 is not used. The seventh contact point 923 is not connected to any intermediary contact point and may for example be connected directly to a communications path that is not shared by the first switch 218 and the second switch 220 but is instead selectively used only by the first switch 218.

Figure 10C:
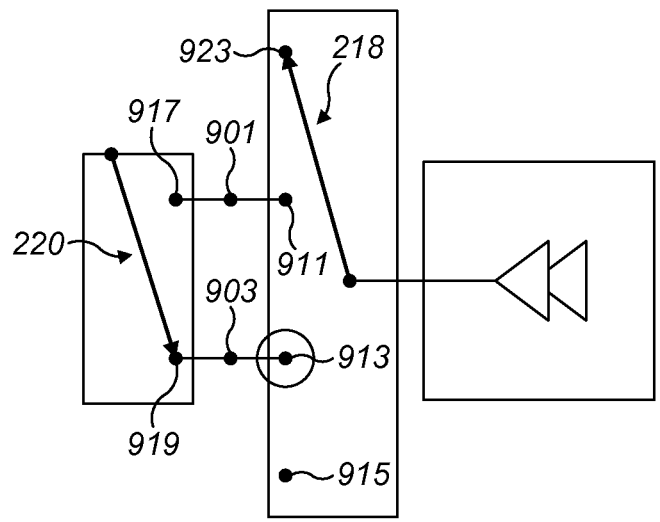

FIG. 10*c* shows a switch arrangement similar to that shown in FIG. 10*b* except that no sixth contact point 921 or third intermediary contact point 905 is present. The third contact point 915 is not connected to any intermediary contact point and may for example be connected directly to a communications path that is not shared by the first switch 218 and the second switch 220 but is instead selectively used only by the first switch 218.

Figure 10D:
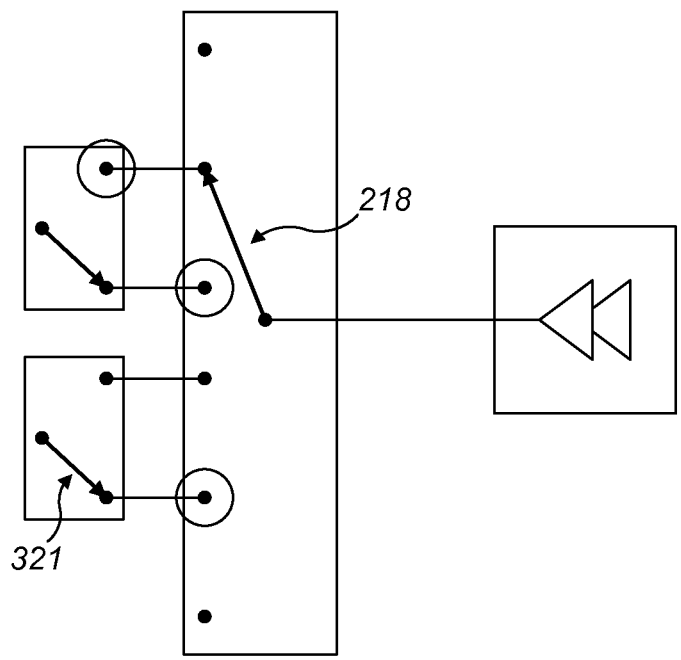
Figure 10E:
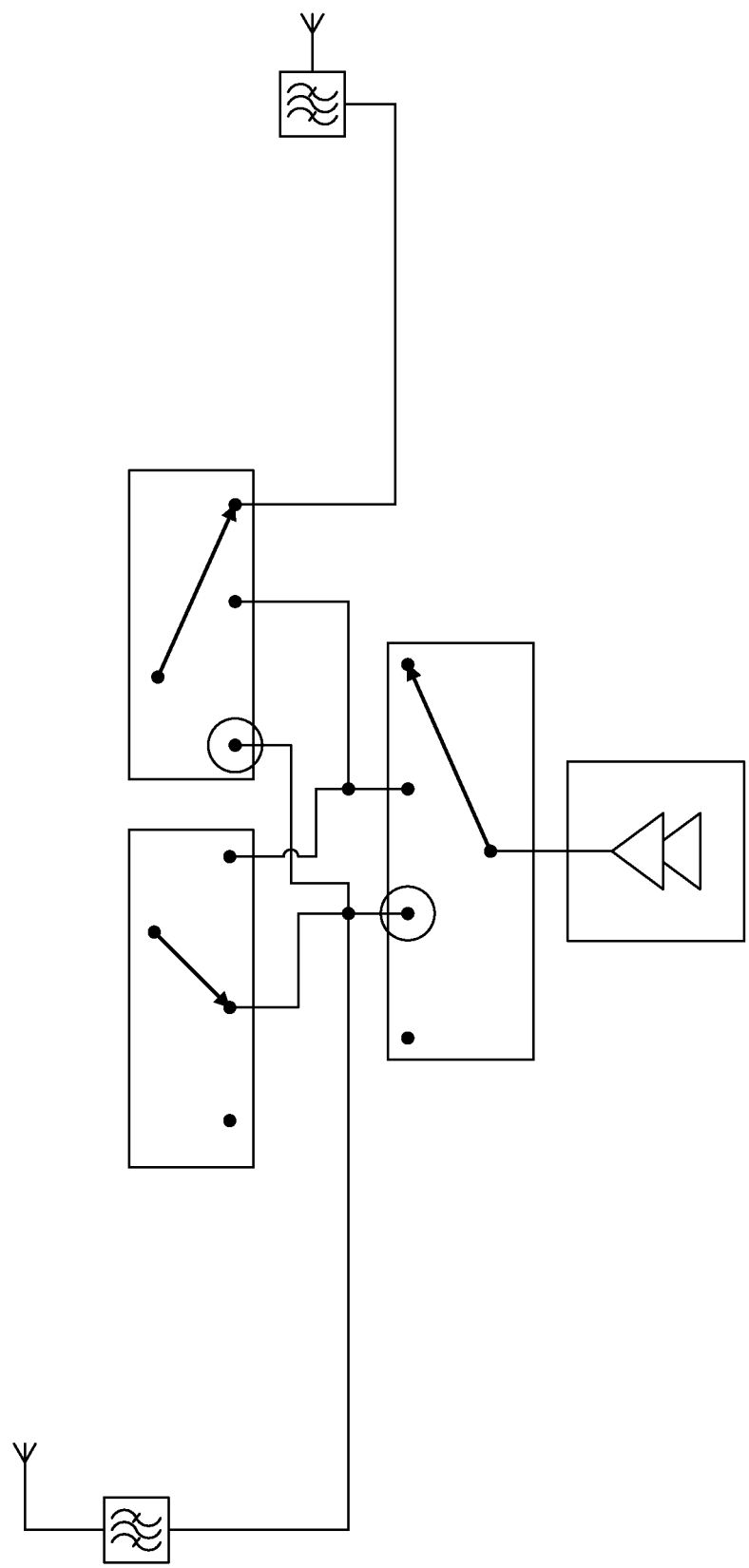
Figure 10F:
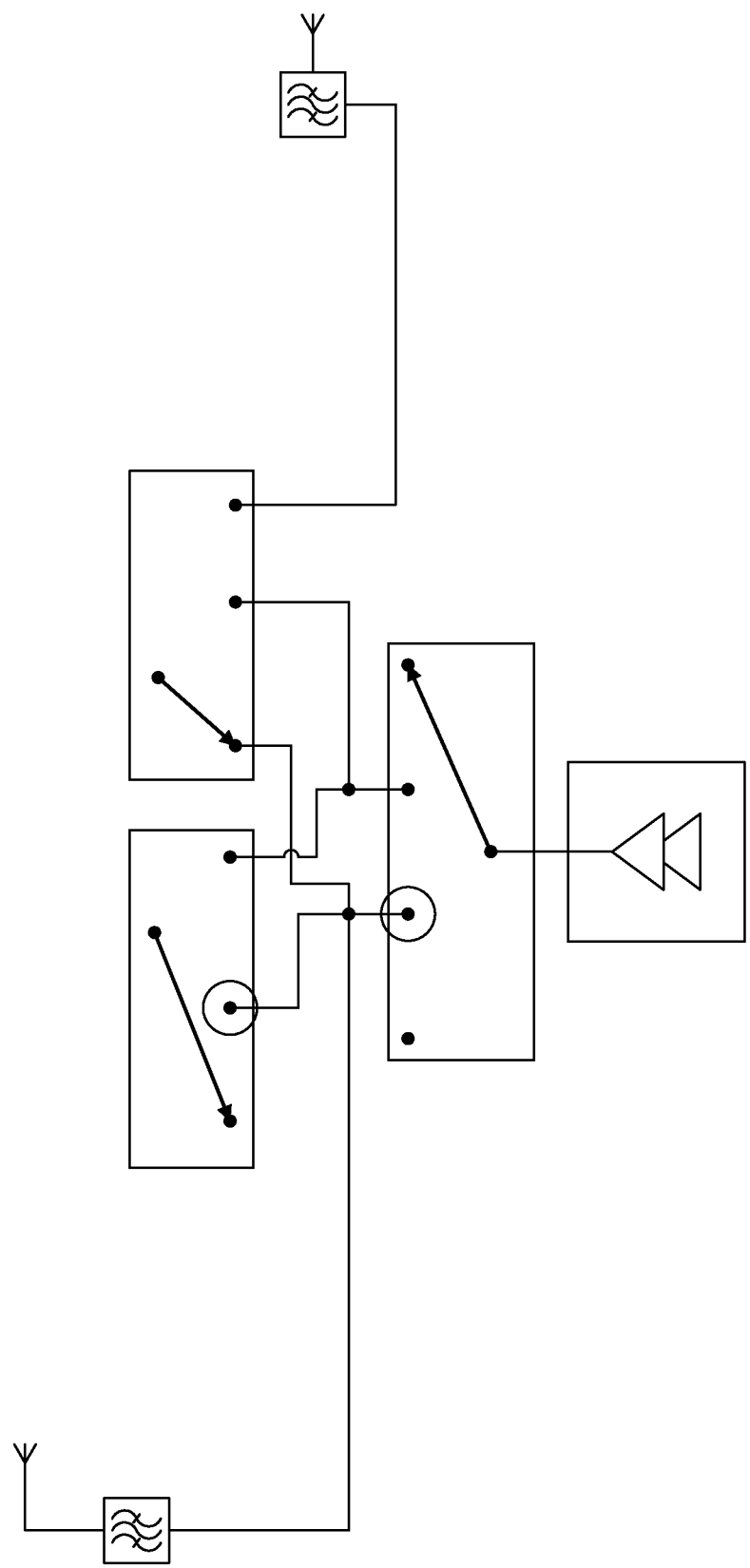
Figure 10G:
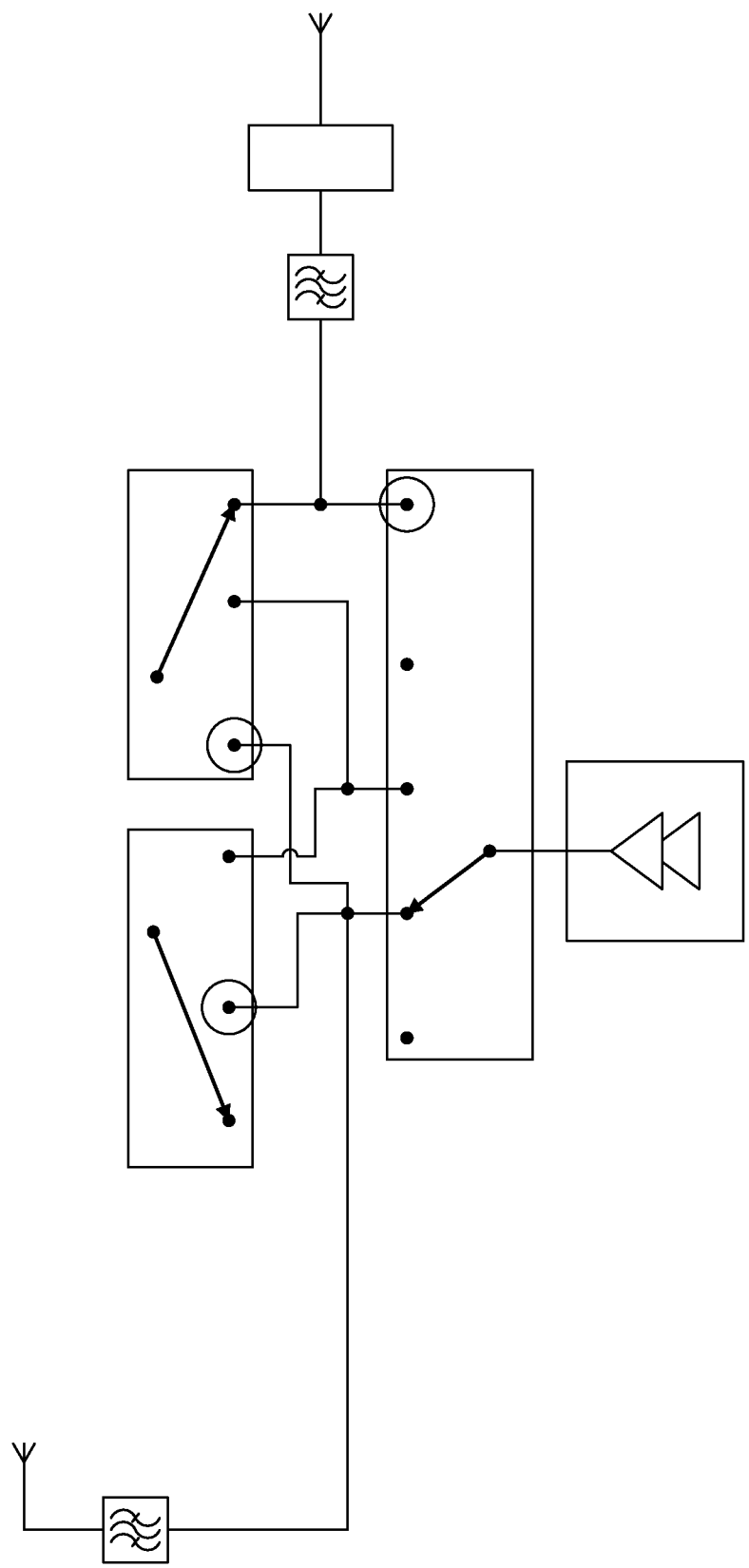
Figure 10H:
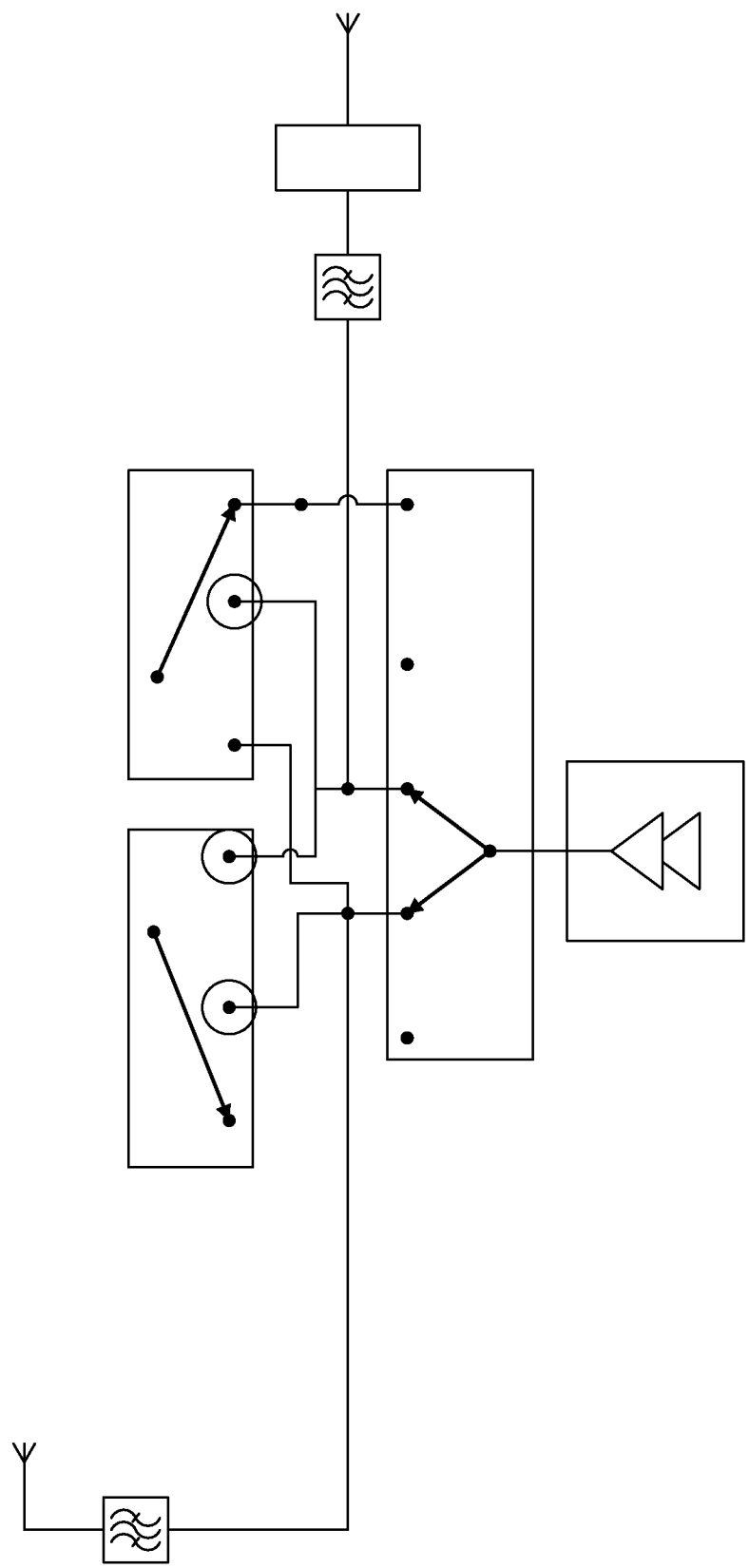

FIG. 10*d* shows a switch arrangement similar to that shown in FIG. 10*c*, except that a third switch 321 is provided having two contact points which are associated with an additional two intermediary contact points. In turn, the two intermediary contact points are associated with two further contact points of the first switch 218.

FIGS. 10*e* to 10*h* show switch arrangements that follow similar principles to that shown in FIGS. 10*a* to 10*d*, except that, in these arrangements at least one intermediary contact point is associated with a contact point of each of the three switches (i.e. and therefore is associated with three contact points). As shown by the circling around the various contact points, when a common intermediary contact point is being used, the associated contact points with that intermediary contact point that are not in use are held at a high impedance.

Figure 10I:
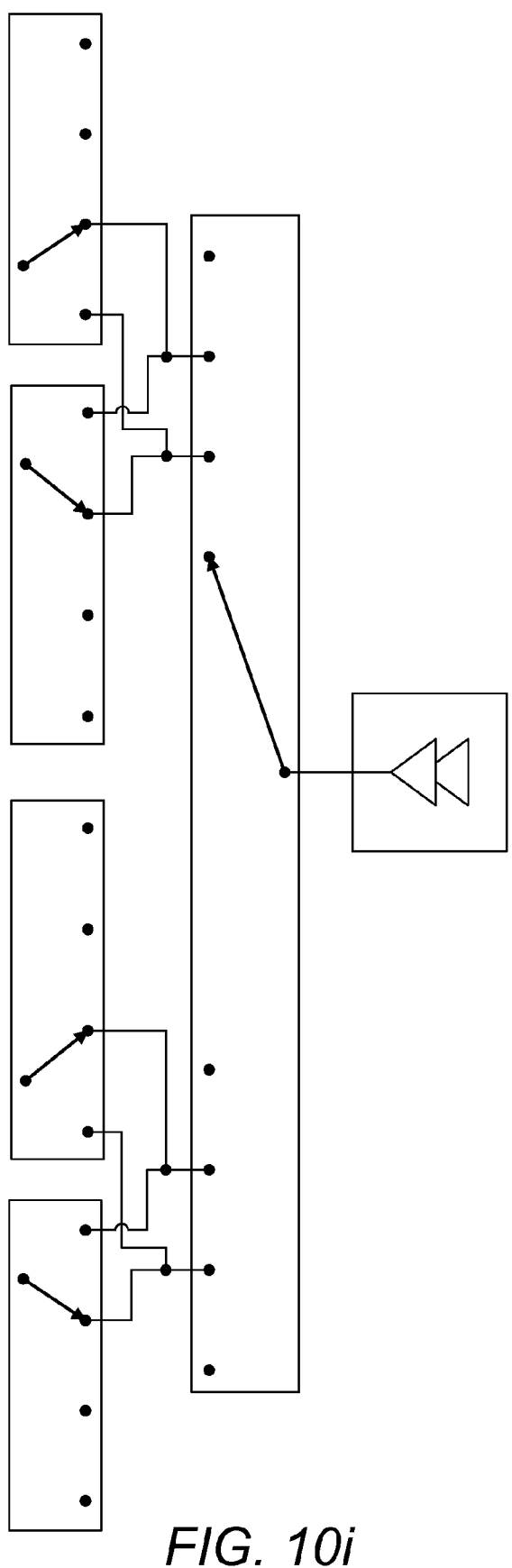

FIG. 10*i* shows a switch arrangement that follows similar principles to that shown in FIGS. 10*a* to 10*h* and demonstrates how numerous switches can be used to form the switch arrangement so that numerous modes of operation can be made possible.

Figure 11B:
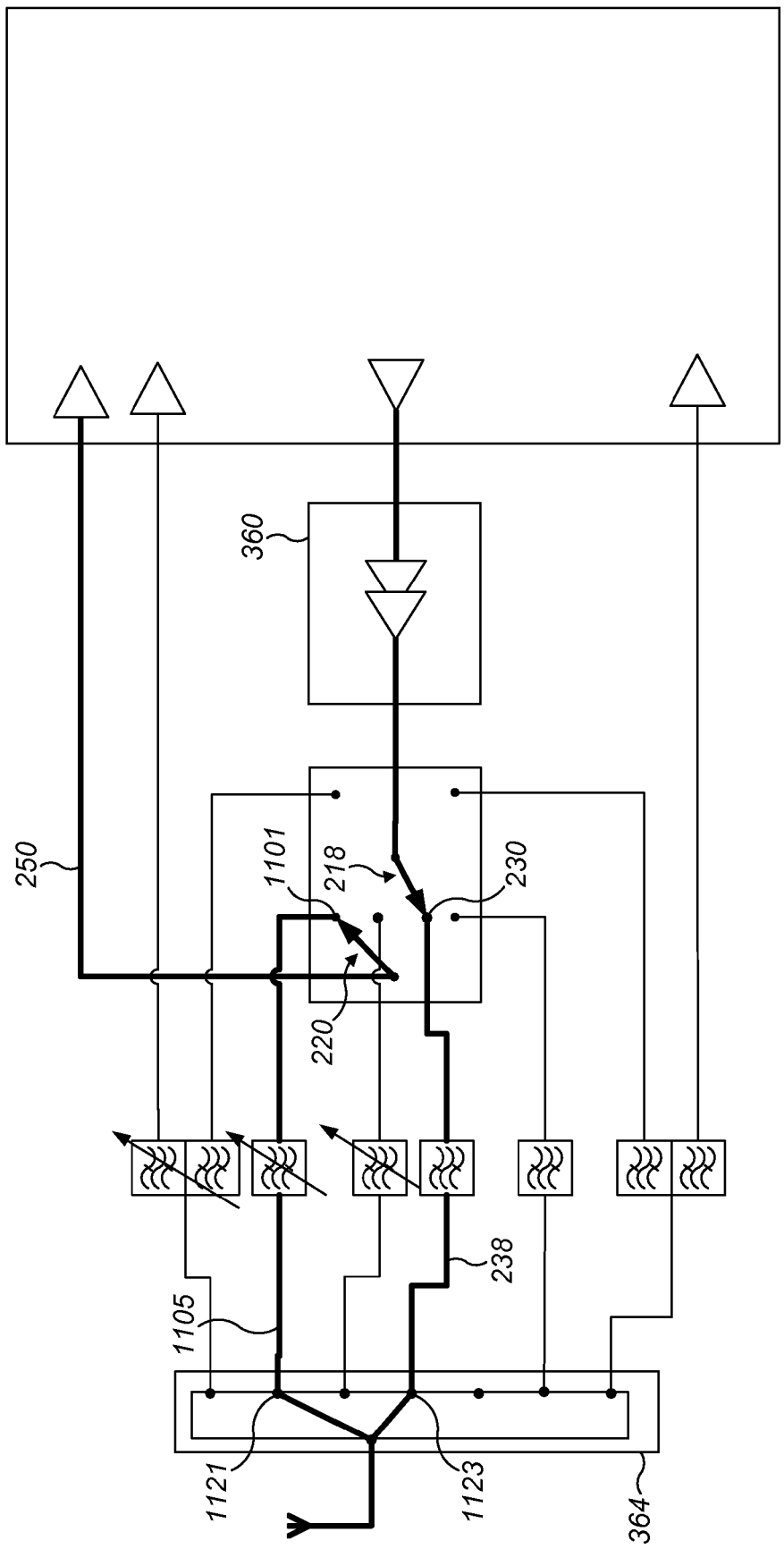
Figure 11C:
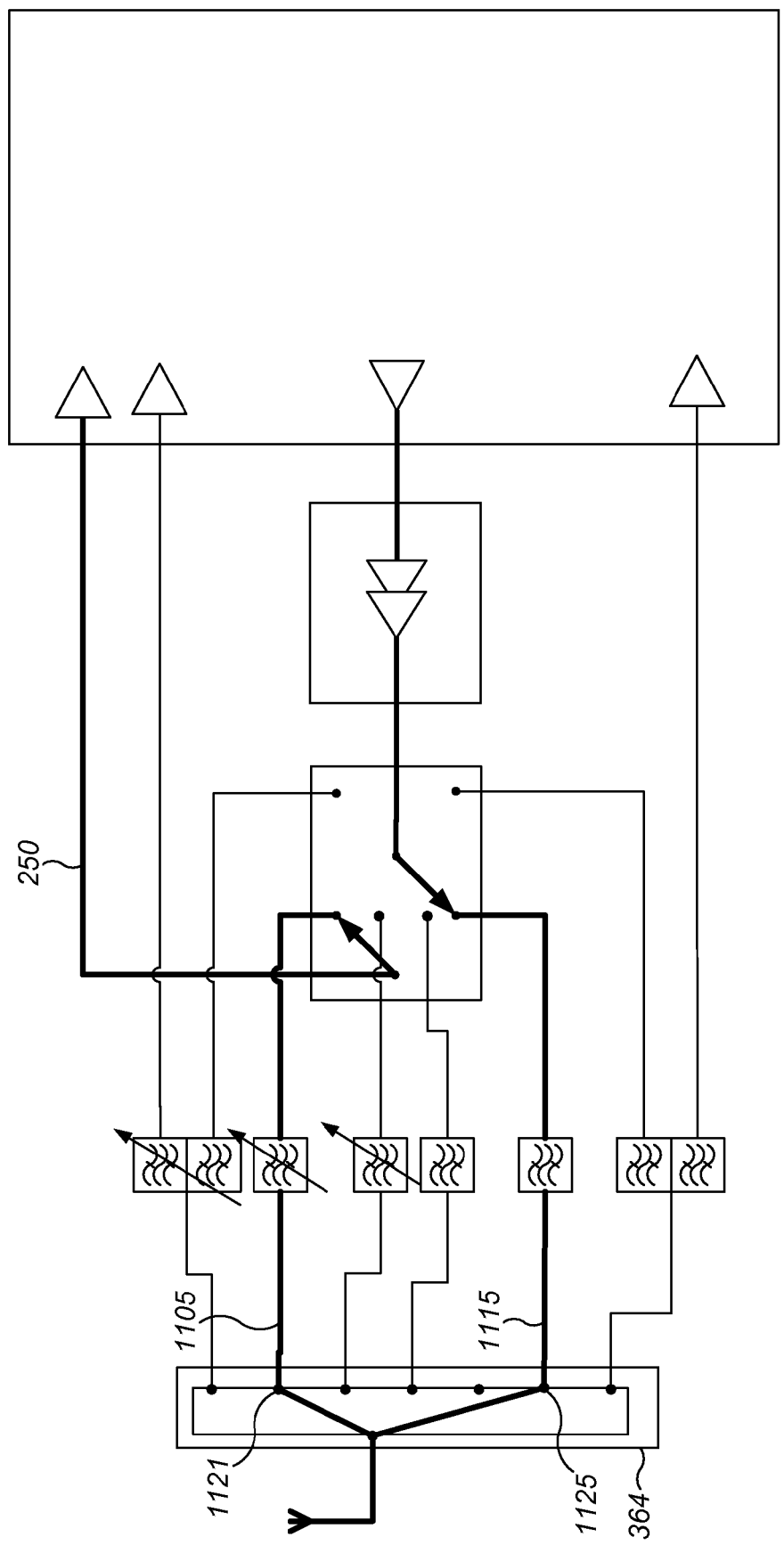

FIGS. 11*a* to 11*c* show schematic circuit diagrams of further examples of operations of a wireless device according to an embodiment of the present invention. These figures show how circuit arrangements having switches similar to those shown in FIGS. 2*a* and 2*b*, and also having an antenna switch module similar to those shown in FIGS. 3*a* to 9, can be used to configure a self-test mode of operation or a calibration mode of operation. In particular, the switch arrangement and antenna switch module can be configured so that "closed loops" can be formed in the circuit. The closed loops are formed such that signals can be sent (transmitted and received) around the circuit (i.e. internally) without the use of the antenna. The RFIC 358 can therefore selectively form different closed loops to perform tests or calibrations of different components provided in the circuit arrangement. This can be useful, for example, to identify components or pathways in the circuit that have malfunctioned or require calibrating by testing using various closed loops in sequence for example.

It is noted that the switch arrangements in these figures have additional communication paths, however it will be appreciated that closed loops can be form with any number of communication paths (or in some cases, not using the communication paths). In particular, in these figures, two additional communication paths are provided compared with those shown in the switch arrangements of FIGS. 2*a* and 2*b*. Therefore, a switch arrangement similar to that shown in FIG. 2*a* (and which may also have the features shown in FIG. 2*b*) is used but additionally having a fifth contact point 1101 and a fifth filter component 1103 for providing a fifth communication path 1105 in accordance with a fifth mode of operation and a sixth contact point 1111 and a sixth filter component 1113 for providing a sixth communication path 1115 in accordance with a sixth mode of operation. Four of the six contact points are arranged so that they can be shared between both switches 218, 220. More particularly, the first switch 218 is capable of connecting to one of six contact points in order to form part of one of six transmitter chains. The second switch 220 is capable of connecting to one of four of the six contact points in order to form part of one of four receiver chains.

In the example of FIG. 11a, the first switch 218 and the second switch 220 are simultaneously connected with one of the shared four contact points, such as the second contact point 230 so as to form a complete pathway or closed loop whereby test signals can be generated and received internally in the wireless device without the use of the antenna 366. The RFIC 358 (or modem BB) controls the calibration or test by first identifying which components are to be tested and or calibrated (i.e. the calibration or test mode). The RFIC 358 (or modem BB) accordingly sends control signals to the switch arrangement so as to position the switches 218, 220 in accordance with the identified calibration or test mode. The RFIC 358 (or modem BB) then generates one or more test signals for transmission via the PA 360. The test signals are sent to the first switch 218 and are conveyed via the second contact point 230 to the second switch 220. The test signals are then sent along the receiver path 250 for reception by the RFIC 358 and subsequent processing. The RFIC 358 measures the received test signals and compares them with the initially generated test signals to determine if the components along the closed loop are functioning as expected. When a self-test operation is being performed, the comparison involves using predefined test limits to see whether the received signal satisfies certain criteria, such as one or more of: a threshold signal strength, a predefined threshold limits, a modulation scheme, a predefined error vector, a predefined magnitude error, a predefined phase error, an expected distribution function of frequencies, and so on. If the predefined test limits are not satisfied, then the RFIC 358 determines that one or more of the components in the closed loop are not functioning correctly. In response to such a determination, the RFIC 358 may optionally set a flag indicating that there is a malfunctioning component in the closed loop. The test can be repeated with each of the four shared contact points. This enables the RFIC 358 to determine if a mode of operation is no longer functional and, in some examples, allows another communication mode pathway to be tuned to replace the non-functional mode of operation. The calibration operation is similar to the self-test operation except that the predefined test limits are associated with tolerance ranges, which when not satisfied, allow the RFIC to calibrate components in the closed loop until the ranges are satisfied. Operation may be performed in production tuning phase, production validation phase, service center or during field operation such after potential failure expected in design.

FIG. 11b shows a similar switch arrangement to that shown in FIG. 11a, except that the first switch 218 and the second switch 220 are connected to different contact points. In this example, the first switch 218 is connected to the second contact point 230. The second switch 220 is connected to the fifth contact point 1101. The antenna switch module 364 simultaneously connects a fifth node 1121 of the antenna switch module 364 (i.e. that is connected to the fifth communication path 1105) to a second node 1123 of the antenna (i.e. that is connected to the second communication path 238). In this manner, a closed loop is formed to include the second communication path 238, the fifth communication path 1105 and all of the components included along these communication paths 238, 1105. A test signal can then be sent around the closed loop in accordance with either a self-test mode of operation or a calibration mode of operation as described with respect to FIG. 11a. Frequency tunable filters in test loop path may be tuned according to testing purpose.

FIG. 11c shows a similar switch arrangement to that shown in FIG. 11b, except that, in this example, the fifth communication path 1105 and sixth communication path 1115 are used to form the closed loop for testing and/or calibration. Accordingly, the antenna switch module 364 is arranged to connect the fifth node 1121 and a sixth node 1125 to one another so as to join the fifth communication path 1105 with the sixth communication path 1115.

Figure 12A:
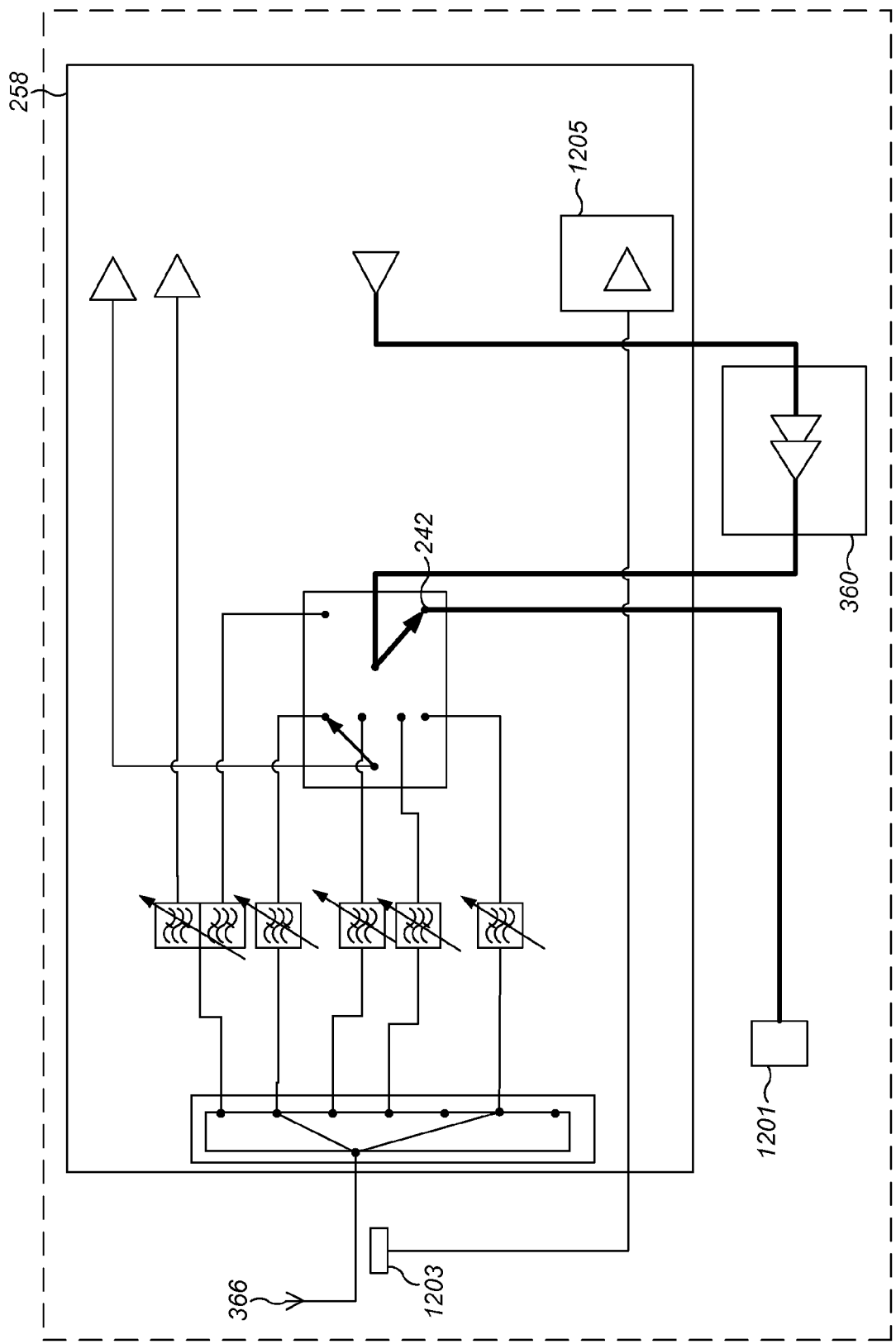
FIGS. 12a and 12b show schematic circuit diagrams of an operation of a ninth example of a wireless device according to an embodiment of the present invention.
Figure 12B:
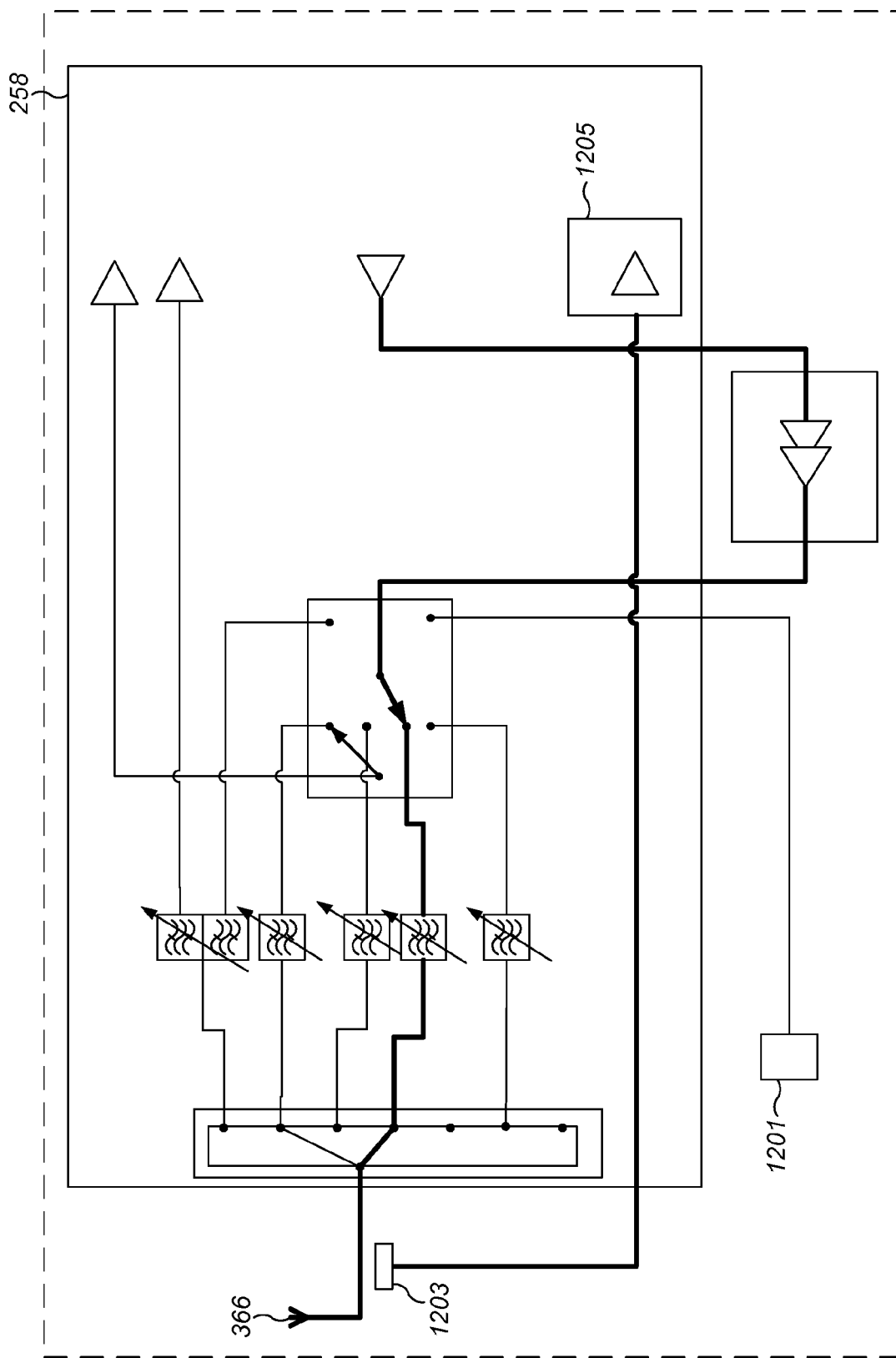

FIGS. 12a and 12b show similar circuit arrangements to those shown in FIGS. 11a to 11c, except that these circuit arrangements can be used for external testing, whereby specialized modules 1201, 1205 can be accessed from without the circuit arrangement in order to assist calibration and/or testing of the circuit arrangement. The circuit arrangements of these figures include a calibration test point module 1201 connected to the fourth connection point 242, an antenna coupler 1203 coupled to the antenna 366 and a measurement receiver module 1205 (which may be integrated with the RFIC 358).

As shown in FIG. 12a, test signals and/or calibration signals can be generated by the RFIC 358 and sent via the PA 360 to the switch arrangement. The signals are then routed to the calibration test point module 1201. The calibration test point module 1201 is for connecting to circuitry configured for directly measuring signals received from the PA 360. For example, this may enable an external device to be connected with the circuit arrangement in order to measure the signals. The measurements can then be used to calibrate the signal generation by the RFIC 358.

FIG. 12b shows the circuit arrangement of FIG. 12a being used to assist calibration of the receiver circuitry in the RFIC 358. In this arrangement, the antenna coupler 1203 receives signals via the antenna 366 and passes the received signals directly to the receiver measurement module 1205. Similar to the calibration test point module 1201, the receiver measurement module 1205 may enable an external device to be connected with the circuit arrangement in order to measure the signals. The measurements can be used to calibrate the receiver circuitry accordingly.

Figure 13:
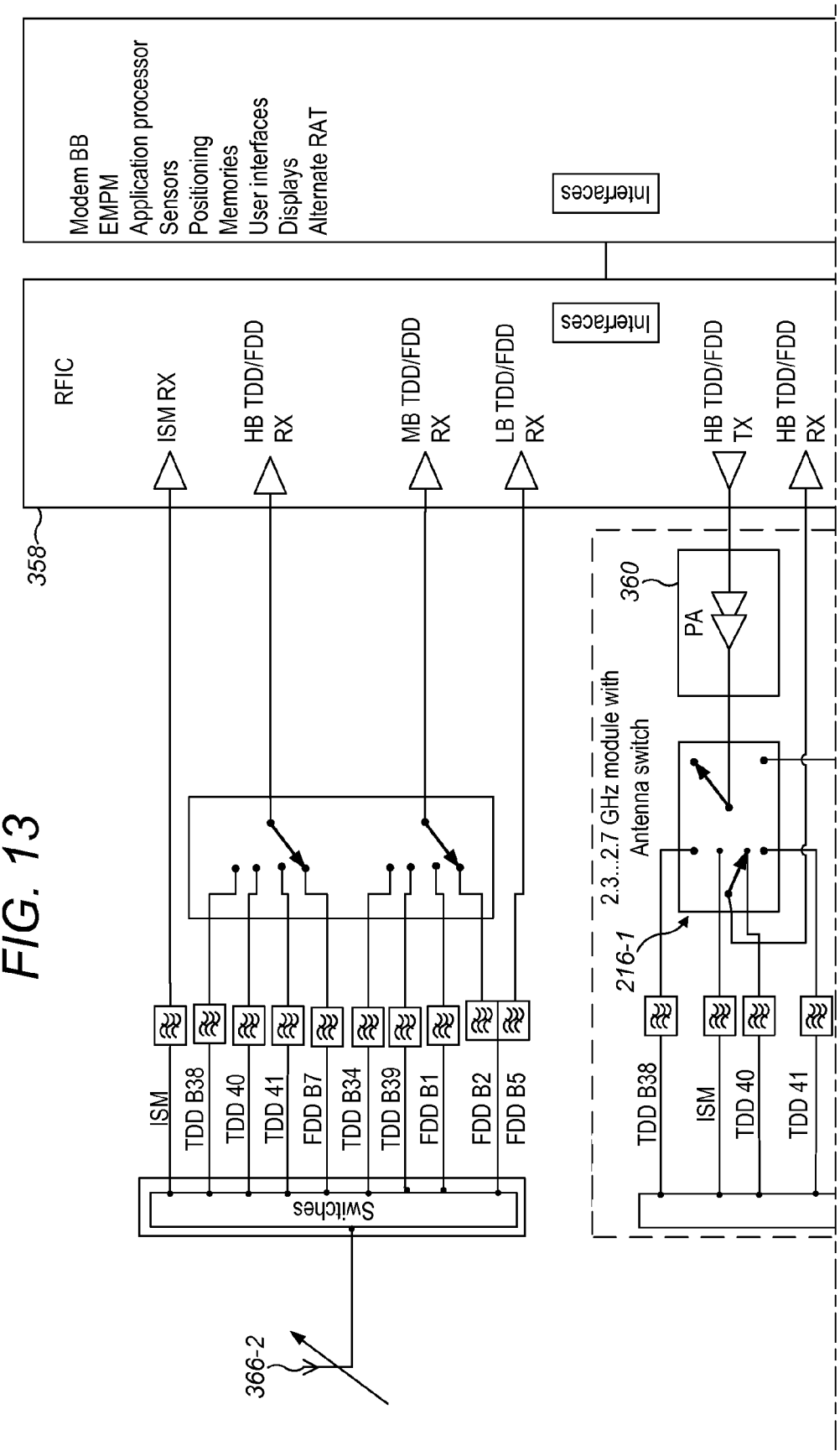
FIG. 13 shows a schematic circuit diagram of an operation of a tenth example of a wireless device according to an embodiment of the present invention.
Figure 13:
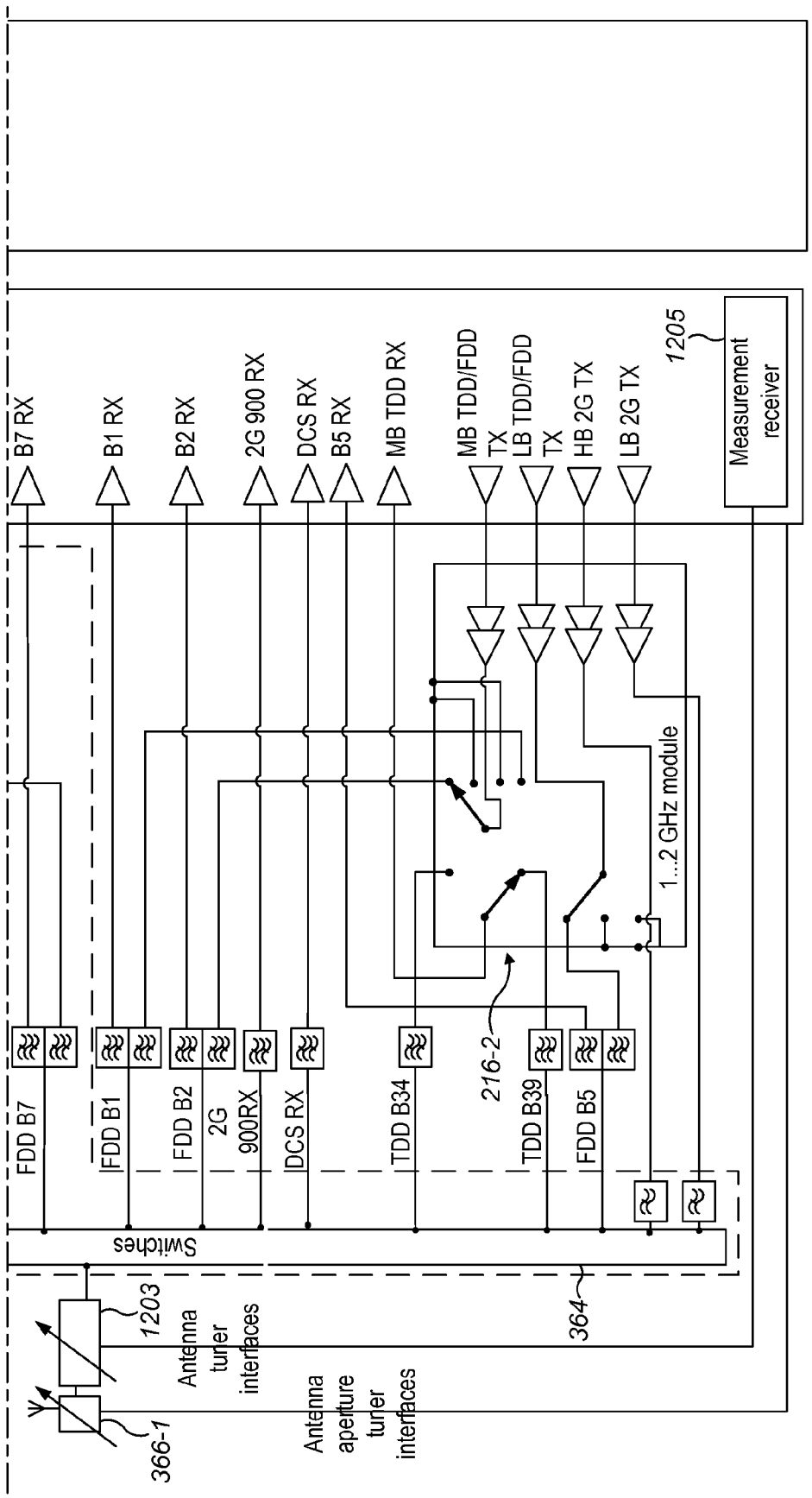

FIG. 13 shows an example of a wireless device that uses at least a first switch arrangement 216-1 and a second switch arrangement 216-2 to provide MMMB functionality. This figure illustrates that various circuit arrangements are possible using the switch arrangements discussed herein, and that the examples given are non-limiting. As such, various different modes and frequency bands of operation are possible, and therefore, as shown by example in FIG. 13, the wireless device can operate in one or more of the following modes: TDD B38 mode, a ISM mode, a TDD 40 mode, a TDD 41 mode, a FDD B7 mode, a FDD B1 mode, a FDD B2 mode, a 2G 900 RX mode, a DCS RX mode, a TDD B34 mode, a TDD B39 mode and a FDD B5 mode. Additionally, the switch arrangements 216-1, 216-2 of FIG. 13 can be used to enable various test modes of operation. For example, in a first test mode of operation, a test signal can be generated by the RFIC 358 and passed to the PA 360 for amplification. The test signal then passes to the first switch arrangement 216-1, which is configured to enable a particular mode of operation to be performed by the wireless device. The test signal is conveyed via an antenna switch module 364 to a first antenna 366-1. An antenna coupler 1203 couples with the first antenna 366-1 so as to receive the test signal and convey the test signal to a measurement receiver module 1205. The measurement receiver module 1205 may be part of the RFIC 358 and can be used for circuit calibration, as described with reference to FIG. 12b. In another example, the first antenna 366-1 may cooperate with a second antenna 366-2. In this manner, the first antenna 366-1 can transmit a signal and the second antenna 366-2 may receive that signal. This allows further methods of forming loops in the circuitry and thereby can provide additional self-test and/or calibration modes of operation.

It will be understood that the processor or processing system or circuitry referred to herein may in practice be provided by a single chip or integrated circuit or plural chips or integrated circuits, optionally provided as a chipset, modem on module, system in package, system on chip, an application-specific integrated circuit (ASIC), field-programmable gate array (FPGA), digital signal processor (DSP), etc. The module, chip or chips may comprise circuitry (as well as possibly firmware) for embodying at least one or more of an antenna switch, switching arrangement, frequency selective filters, antenna tuner, antenna aperture tuner, matching, regulators, controller, controller interfaces, a power amplifier, control interfaces, power interfaces, a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

We claim:

1. A switch arrangement for a radio frequency circuit, the switch arrangement comprising:
   a first switch comprising a single pole, the first switch configured to selectively connect said pole to one of at least a first communication path and a second communication path; and
   a second switch comprising a single pole, the second switch configured to selectively connect said pole to one of at least the first communication path and the second communication path,
   wherein the first switch is configured for a first mode of operation to connect a radio frequency signal received at the pole of the first switch via a power amplifier from a processing system to the first communication path to form at least a part of a transmitter chain for transmitting radio frequency signals in the first mode;
   wherein the second switch is configured for the first mode of operation to connect the pole of the second switch to the first communication path for receiving a radio frequency signal at the pole of the second switch via the first communication path to form at least a part of a receiver chain for receiving radio frequency signals in the first mode;
   wherein the first switch is configured for a second mode of operation to connect a radio frequency signal received at the pole of the first switch via the power amplifier from the processing system to the second communication path to form at least a part of a second transmitter chain for transmitting radio frequency signals in the second mode; and
   the switch arrangement further comprising a first terminator associated with the first communication path and a second terminator associated with the second communication path, the first terminator and the second terminator being arranged to selectively use impedance matching to reduce reflection of received radio frequency signals on the respective first or second communication path when the respective first or second communication path is not being used for communications in accordance with a selected mode of operation.

2. A switch arrangement according to claim 1, comprising a first filter in the first communication path, the first filter having a characteristic associated with the first mode of operation so as to enable the filtering of radio frequency signals according to the first mode, and wherein the switch arrangement comprises a second filter in the second communication path, the second filter having a characteristic associated with the second mode of operation so as to enable the filtering of radio frequency signals according to the second mode.

3. A switch arrangement according to claim 1, wherein at least one of the first mode and the second mode of operation is a time division duplex (TDD) mode of operation.

4. A switch arrangement according to claim 1, wherein the first mode of operation is a time division duplex (TDD) mode of operation and the second mode of operation is a frequency division duplex (FDD) mode of operation.

5. A switch arrangement according to claim 1, wherein the second switch is configured to connect the pole of the second switch to the second communication path for receiving a radio frequency signal at the pole of the second switch via the second communication path to form at least a part of a receiver chain for receiving radio frequency signals in the second mode.

6. A switch arrangement according to claim 1, wherein the first switch and the second switch are configured in dependence on at least one received control signal indicative of a selected mode of operation.

7. A switch arrangement according to claim 1, wherein the first switch is configured for a third mode of operation to connect a radio frequency signal received at the pole of the first switch via the power amplifier from the processing system to a third communication path to form at least a part of a transmitter chain for transmitting radio frequency signals in the third mode.

8. A switch arrangement according to claim 1, wherein at least one of the first terminator and the second terminator is an impedance tuneable terminator associated with the single pole of the second switch, the impedance tuneable terminator being arranged to selectively use tuneable impedance matching so as to prevent reflection of radio frequency signals at the single pole of the second switch when the second switch is not being used for a mode of operation.

9. A switch arrangement according to claim 1, wherein the first switch and the second switch are simultaneously configured to form connections for enabling a carrier aggregation operation to be performed.

10. A wireless device comprising:
    at least one antenna arranged to at least one of transmit and receive radio frequency signals;
    an antenna switch arranged to selectively connect one of at least a first communication path and a second communication path to the antenna for at least one of transmitting and receiving radio frequency signals;

a processing system arranged to generate radio frequency signals for transmission by the antenna and arranged to process radio frequency signals received by the antenna;

a power amplifier connected to the processing system and arranged to amplify radio frequency signals for transmission by the antenna; and a switch arrangement comprising:
  a first switch comprising a single pole, the first switch being configured to selectively connect said pole to one of the first communication path and the second communication path; and
  a second switch comprising a single pole, the second switch being configured to selectively connect said pole to one of the first communication path and the second communication path, wherein the first switch is configured for a first mode of operation to connect a radio frequency signal received at the pole of the first switch via the power amplifier from the processing system to the first communication path to form at least a part of a transmitter chain for transmitting radio frequency signals in the first mode;

wherein the second switch is configured for the first mode of operation to connect the pole of the second switch to the first communication path for receiving a radio frequency signal at the pole of the second switch via the first communication path to form at least a part of a receiver chain for receiving radio frequency signals in the first mode;

wherein the first switch is configured for a second mode of operation to connect a radio frequency signal received at the pole of the first switch via the power amplifier from the processing system to the second communication path to form at least a part of a second transmitter chain for transmitting radio frequency signals in the second mode; and wherein the switch arrangement further comprising a first terminator associated with the first communication path and a second terminator associated with the second communication path, the first terminator and the second terminator being arranged to selectively use impedance matching to reduce reflection of received radio frequency signals on the respective first or second communication path when the respective first or second communication path is not being used for communications in accordance with a selected mode of operation.

11. A method of operating a wireless device, the wireless device comprising an antenna, an antenna switch, a processing system, a power amplifier connected to the processing system, and a switch arrangement comprising a first single-pole, multiple-throw switch and a second single-pole, multiple-throw switch, the method comprising:

determining a mode of operation for operation of the wireless device;

selectively connecting at least one of the first switch and the second switch to at least one of a first communication path and a second communication path for at least one of transmission and reception of radio frequency signals in accordance with the determined mode of operation;

responsive to the determined mode of operation being a first mode of operation for transmitting radio frequency signals, connecting a radio frequency signal received at the pole of the first switch via the power amplifier from the processing system to the first communication path to form at least a part of a transmitter chain for transmitting radio frequency signals in the first mode;

responsive to the determined mode of operation being a first mode of operation for reception of radio frequency signals, connecting the pole of the second switch to the first communication path for receiving a radio frequency signal at the pole of the second switch via the first communication path to form at least a part of a receiver chain for receiving radio frequency signals in the first mode; and responsive to the determined mode of operation being a second mode of operation for transmission of radio frequency signals, connecting a radio frequency signal received at the pole of the first switch via the power amplifier from the processing system to the second communication path to form at least a part of a second transmitter chain for transmitting radio frequency signals in the second mode; wherein the switch arrangement further comprising a first terminator associated with the first communication path and a second terminator associated with the second communication path, and the method further including the first terminator and the second terminator selectively using impedance matching to reduce reflection of received radio frequency signals on the respective first or second communication path when the respective first or second communication path is not being used for communications in accordance with the determined mode of operation.

12. A method according to claim 11, wherein at least one of the first mode and the second mode of operation is a time division duplex (TDD) mode of operation.

13. A method according to claim 11, wherein the first mode of operation is a time division duplex (TDD) mode of operation and the second mode of operation is a frequency division duplex (FDD) mode of operation.

14. A method according to claim 11, comprising responsive to the determined mode of operation being a second mode of operation for reception of radio frequency signals, connecting the pole of the second switch to the second communication path for receiving a radio frequency signal at the pole of the second switch via the second communication path to form at least a part of a receiver chain for receiving radio frequency signals in the second mode.

15. A method according to claim 11, comprising configuring the first switch and the second switch in dependence on at least one control signal received from the processing system, the control signal being indicative of a selected the determined mode of operation.

16. A method according to claim 11, comprising responsive to the determined mode of operation being a third mode of operation, connecting a radio frequency signal received at the pole of the first switch via the power amplifier from the processing system to a third communication path to form at least a part of a transmitter chain for transmitting radio frequency signals in the third mode.

17. A method according to claim 11, comprising selectively forming connections between said pole of the first switch and each of a plurality of communication paths so as to enable transmission of radio frequency signals in one of a plurality of modes of operation including one or more time division duplex (TDD) modes of operation.

18. A method according to claim 11, comprising simultaneously configuring the first switch and the second switch to form connections for enabling a carrier aggregation operation to be performed.

* * * * *